US010468006B2

(12) United States Patent
Seto et al.

(10) Patent No.: US 10,468,006 B2
(45) Date of Patent: Nov. 5, 2019

(54) TRANSPORTATION VEHICLE PART AND PANEL MEMBER THEREFOR

(71) Applicant: NIPPON STEEL & SUMITOMO METAL CORPORATION, Tokyo (JP)

(72) Inventors: Atsushi Seto, Tokyo (JP); Koichi Hamada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 15/119,624

(22) PCT Filed: Feb. 2, 2015

(86) PCT No.: PCT/JP2015/052873
§ 371 (c)(1),
(2) Date: Aug. 17, 2016

(87) PCT Pub. No.: WO2015/129394
PCT Pub. Date: Sep. 3, 2015

(65) Prior Publication Data
US 2017/0069304 A1 Mar. 9, 2017

(30) Foreign Application Priority Data
Feb. 25, 2014 (JP) .................. 2014-033798

(51) Int. Cl.
B32B 15/04 (2006.01)
F16F 15/02 (2006.01)
(Continued)

(52) U.S. Cl.
CPC ............... *G10K 11/16* (2013.01); *B32B 7/05* (2019.01); *B32B 15/043* (2013.01); *B32B 15/08* (2013.01);
(Continued)

(58) Field of Classification Search
CPC .... G10K 11/004; G10K 11/16; G10K 11/168; B32B 15/18; B32B 15/043; F16F 15/02;
(Continued)

(56) References Cited

U.S. PATENT DOCUMENTS 4,292,832 A * 10/1981 Nakae .................... G10K 11/16
248/636
4,678,707 A * 7/1987 Shinozaki ............... B32B 15/08
428/323

(Continued)

FOREIGN PATENT DOCUMENTS

CN 1188177 A 7/1998
CN 102869801 A 1/2013
(Continued)

OTHER PUBLICATIONS

International Search Report for PCT/JP2015/052873 dated Apr. 28, 2015.
(Continued)

Primary Examiner — Catherine A. Simone
(74) Attorney, Agent, or Firm — Birch, Stewart, Kolasch & Birch, LLP

(57) ABSTRACT

A transportation vehicle part includes: a patch member 13 constructed of a plate-like metal patch panel 12, and a vibration attenuating resin layer 14 provided along a surface of the patch panel 12; and a metal base plate 16 closely adhered with the vibration attenuating resin layer 14 of the patch member 13 and affixed with the patch member 13. The patch panel 12 is produced via a rolling step. An acute angle between a longitudinal direction and a rolling direction of the patch panel 12 is 30 to 70 degrees. According to this structure, the natural frequency in a primary mode is made high, whereby the vibration characteristic is improved.

12 Claims, 28 Drawing Sheets

(51) Int. Cl.
  *G10K 11/16* (2006.01)
  *B62D 25/20* (2006.01)
  *B62D 25/14* (2006.01)
  *B62D 25/08* (2006.01)
  *B32B 7/05* (2019.01)
  *B32B 15/08* (2006.01)
  *B32B 15/18* (2006.01)
  *B32B 27/00* (2006.01)
  *F16F 15/08* (2006.01)

(52) U.S. Cl.
  CPC .............. *B32B 15/18* (2013.01); *B32B 27/00* (2013.01); *F16F 15/02* (2013.01); *F16F 15/08* (2013.01); *B32B 2250/03* (2013.01); *B32B 2307/54* (2013.01); *B32B 2307/56* (2013.01); *B32B 2605/08* (2013.01); *B62D 25/088* (2013.01); *B62D 25/14* (2013.01); *B62D 25/20* (2013.01)

(58) Field of Classification Search
  CPC ........... F16F 15/04; F16F 15/08; B60R 13/08; B60R 13/083; B60R 13/0846; B60R 13/0884; B62D 25/02; B62D 25/14; B62D 25/20; B62D 25/2045; B62D 25/2054
  USPC .................................................. 181/207, 211
  See application file for complete search history.

(56) References Cited

U.S. PATENT DOCUMENTS

| | | |
|---|---|---|
| 5,796,055 A | 8/1998 | Benson, Jr. et al. |
| 6,177,173 B1 | 1/2001 | Nelson |
| 8,073,298 B2 | 12/2011 | Meidar |
| 8,479,876 B2* | 7/2013 | Fetsko .................... B60R 13/08 181/207 |
| 2011/0315473 A1 | 12/2011 | Fetsko et al. |
| 2013/0008570 A1* | 1/2013 | Ikeda ....................... C21D 9/46 148/533 |

FOREIGN PATENT DOCUMENTS

| | | |
|---|---|---|
| CN | 102896836 A | 1/2013 |
| CN | 102947134 A | 2/2013 |
| JP | 59-160224 U | 10/1984 |
| JP | 62-64844 A | 3/1987 |
| JP | 5-42629 A | 2/1993 |
| JP | 2000-336606 A | 12/2000 |
| JP | 2013-508219 A | 3/2013 |
| JP | 2013-535030 A | 9/2013 |

OTHER PUBLICATIONS

Written Opinion of the International Searching Authority for PCT/JP2015/052873 (PCT/ISA/237) dated Apr. 28, 2015.
Korean Office Action for corresponding Korean Application No. 10-2016-7022092, dated Aug. 30, 2018, with English translation.
Mexican Office Action, dated Oct. 10, 2018, for Mexican Application No. MX/a/2016/010019, with English translation.
Chinese Office Action and Search Report dated Mar. 20, 2019 for Application No. 201580009341.8, along with English translations.
Indian Office Action for counterpart Indian Application No. 201617026197, dated May 29, 2019, with English translation.

* cited by examiner

TRANSPORTATION VEHICLE PART AND PANEL MEMBER THEREFOR

TECHNICAL FIELD

The present invention relates to a panel member for attenuating noise and vibration and a patch panel therefor.

BACKGROUND ART

In transportation vehicles such as automobiles, railroad vehicles, vessels, and aircrafts, noise and vibration are generated due to various kinds of factors.

For example, an engine or a motor that is an automobile power source generates noise and vibration while the engine or the motor is being driven. In addition, while an automobile travels, noise and vibration are generated in the vehicle body by an uneven road surface or the like. If such noise and vibration are directly transmitted into the vehicle body (cabin), occupants in the vehicle may be uncomfortable.

In view of this, techniques for suppressing such noise and vibration have been developed heretofore. For example, Patent Literature 1 discloses a sound attenuating patch for reducing noise and vibration of a panel assembly. For another example, Patent Literature 2 discloses a vehicle floor tub for reducing noise and vibration which are transmitted into the vehicle.

The sound attenuating panel disclosed in Patent Literature 1 is adhered on a main panel of the panel assembly with an adhesive layer. In the vehicle floor tub disclosed in Patent Literature 2, a noise attenuating patch is adhered on a main panel with an adhesive layer. Thus, each of the sound attenuating panel of Patent Literature 1 and the noise attenuating panel of Patent Literature 2 is used by being adhered on the main panel in order to reduce noise and vibration.

CITATION LIST

Patent Literature

Patent Literature 1: JP 2013-535030T
Patent Literature 2: JP 2013-508219T

SUMMARY OF INVENTION

Technical Problem

When a panel assembly or a vehicle floor tub as described above is actually used, the vibration characteristic at frequencies including the frequencies in the conditions in which the panel assembly or the vehicle floor tub is used (for example, frequencies of vibration which is applied to the panel assembly or the vehicle floor tub while a vehicle travels or an engine drives) is important. The vibration characteristic at the above frequencies may be improved by increasing a natural frequency in a primary mode, for example. Nevertheless, according to an intensive research that was conducted by the inventors of the present invention, there may be cases in which the vibration characteristic of the panel assembly at the above frequencies cannot be sufficiently improved by merely affixing the sound attenuating panel on the main panel. Similarly, there may be cases in which the vibration characteristic of the vehicle floor tub at the above frequencies cannot be sufficiently improved by merely affixing the noise attenuating patch on the main panel. In such cases, noise and vibration may not be appropriately suppressed.

The present invention has been achieved in order to solve these problems, and an object of the present invention is to provide a transportation vehicle part for appropriately improving the vibration characteristic of a panel member and a panel member having a vibration characteristic that is appropriately improved.

Solution to Problem

The inventors of the present invention conducted an intensive research on a structure for improving the vibration characteristic of a panel member, in which a patch member is affixed on a main panel. A patch panel for constructing a patch member of a panel member as described above is generally obtained from a rolled metal plate. More specifically, normally, considering the production yield, a patch panel may be obtained from a metal plate so that the rolling direction of the metal plate will be the longitudinal direction of the patch panel or the direction orthogonal to the rolling direction of the metal plate will be the longitudinal direction of the patch panel. However, according to a result of the search that was conducted by the inventors of the present invention, when a patch panel is obtained as described above, the vibration characteristic of a panel member may not be sufficiently improved. Then, the inventors of the present invention performed various studies on the reason why the vibration characteristic of the panel member is not improved.

Metal plates that are produced via a rolling step are applied with plastic strain in rolling. The amount of the plastic strain differs according to the direction at any position in the metal plate. For example, the amount of the plastic strain differs between the rolling direction and a direction orthogonal to the rolling direction (width direction). The difference in the plastic strain generates anisotropy in the Young's modulus of the metal plate. Specifically, as shown in FIG. 3, which is described later, the Young's modulus of a patch panel which is obtained from a rolled metal plate is the highest in a direction of approximately 90 degrees with respect to the rolling direction and is the lowest in directions of approximately 45 degrees and approximately 135 degrees with respect to the rolling direction. Such anisotropy in the Young's modulus is especially great in a metal plate having a high tensile strength (for example, a high tensile steel).

The inventors of the present invention considered that such anisotropy in the Young's modulus of the patch panel may greatly affect the vibration characteristic of a panel member. Then, it was found that a relationship between the rolling direction of the patch panel (factor that affects the anisotropy in the Young's modulus) and the longitudinal direction of the patch panel greatly affects the vibration characteristic of the panel member.

The present invention has been completed based on the above findings, and the present invention provides a panel member and a patch panel as described below.

(1)

A transportation vehicle part including:
a patch member constructed of
a plate-like metal patch panel, and
a vibration attenuating resin layer provided along a surface of the patch panel; and a metal base plate closely adhered with the vibration attenuating resin layer of the patch member and affixed with the patch member, wherein the patch panel is produced via a rolling step, and wherein an acute angle between a longitudinal direction and a rolling direction of the patch panel is 30 to 70 degrees.

(2) The transportation vehicle part according to (1), wherein the base plate is produced via a rolling step, and wherein an acute angle between the longitudinal direction of the patch panel and a rolling direction of the base plate is 30 to 70 degrees.

(3) The transportation vehicle part according to (1) or (2), wherein the patch panel is a steel sheet which has a tensile strength of 590 MPa or more.

(4) The transportation vehicle part according to any one of (1) to (3), wherein the patch panel and the base plate are welded together at at least one part of the patch panel and the base plate.

(5) The transportation vehicle part according to any one of (1) to (4), wherein the transportation vehicle part includes a ridged portion, and the patch panel and the base plate are welded together at at least one part of the ridged portion.

(6) The transportation vehicle part according to any one of (1) to (5), wherein the transportation vehicle part is provided with a rigidity reinforced portion which has a recessed and projected shape.

(7) The transportation vehicle part according to any one of (1) to (6), wherein the vibration attenuating resin layer has conductivity.

(8) The transportation vehicle part according to any one of (1) to (7), wherein the patch panel has a thickness of 0.3 mm or more and not greater than a thickness of the base plate.

(9) The transportation vehicle part according to any one of (1) to (8), wherein the vibration attenuating resin layer has a thickness of 10 μm or more to 1000 μm or less.

(10) The transportation vehicle part according to any one of (1) to (9), wherein the vibration attenuating resin layer is constructed of multiple layers which have different temperature characteristics with each other.

(11) The transportation vehicle part according to (10), wherein a panel is inserted between the multiple layers.

(12) The transportation vehicle part according to any one of (1) to (11), wherein an uneven surface processing is performed on a surface of the patch panel or a surface of the base plate, which contacts the vibration attenuating resin layer.

(13) A panel member including:

a patch member constructed of
a plate-like metal patch panel, and
a vibration attenuating resin layer provided along a surface of the patch panel; and a metal base plate closely adhered with the vibration attenuating resin layer of the patch member and affixed with the patch member, wherein the patch panel is produced via a rolling step, and wherein an acute angle between a longitudinal direction and a rolling direction of the patch panel is 30 to 70 degrees.

Advantageous Effects of Invention

According to the present invention, a panel member having a vibration characteristic that is improved and a patch panel for improving the vibration characteristic of the panel member are obtained.

DESCRIPTION OF EMBODIMENTS

Figure 1A:
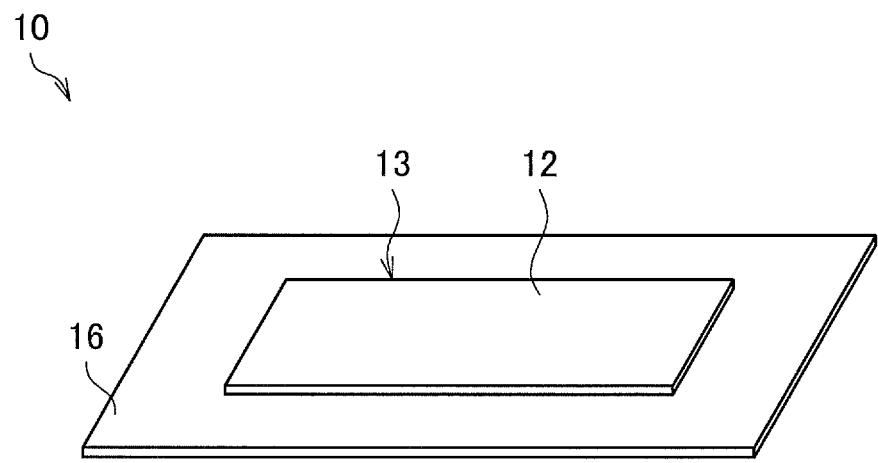
FIG. 1A is an external perspective view of a panel member according to an embodiment of the present invention.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Figure 1B:
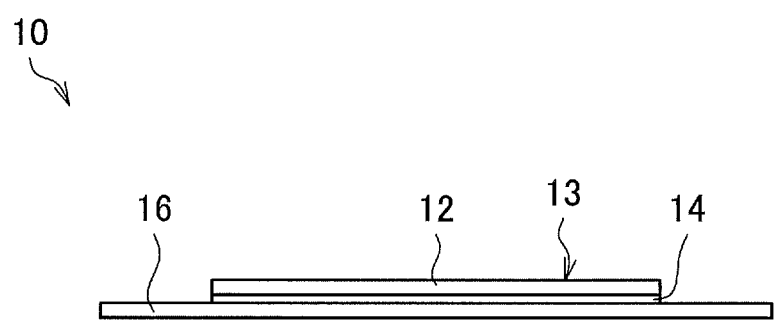
FIG. 1B is a side view of a panel member.

Hereinafter, a patch panel and a panel member provided with the patch panel of the present invention will be described in detail. FIG. 1A is an external perspective view showing a panel member 10 according to an embodiment of the present invention, and FIG. 1B is a side view of the panel member 10. The panel member 10 may be formed into a dash panel of an automobile in an automobile manufacturing plant, for example.

As shown in FIGS. 1A and 1B, the panel member 10 includes a patch member 13 and a metal main body (base plate or main panel) 16. The patch member 13 is constructed of a metal patch panel 12 and a vibration attenuating resin layer 14 which is provided along a surface of the patch panel 12, and the patch panel 12 is affixed on the main body 16 via the vibration attenuating resin layer 14. The patch panel 12 and the main panel 16 may be respectively made of metal plates which are produced via a rolling step. Specifically, the patch panel 12 and the main body 16 are respectively made of rolled steel plates, for example. The vibration attenuating resin layer 14 is made of a viscoelastic resin and is made of, for example, an acrylic resin which also functions as an adhesive or an epoxy resin. As the patch panel 12, a steel plate having a tensile strength of 590 MPa or more is preferably used, but a material having a tensile strength of 590 MPa or more, such as a soft steel, may also be used.

In this embodiment, each of the patch member 13 and the main body 16 has a rectangular shape in a plan view. The patch member 13 is smaller in size than the main body 16 in the plan view. The thickness of the patch panel 12 is preferably 0.5 to 2.0 mm, for example, and the thickness of the main body 16 is preferably 0.7 to 3.2 mm, for example.

The panel member 10 is produced as described below, for example. First, a main body 16 and a patch panel 12 are prepared, and a patch member 13 is constructed by applying a vibration attenuating resin layer 14 on the patch panel 12. Then, by closely adhering the main body 16 and the vibration attenuating resin layer 14 to each other, the patch member 13 is affixed on the main body 16. At this time, the patch member 13 and the main body 16 are pressed to each other in a condition in which the patch member 13 and the main body 16 are heated to 200° C., whereby the patch member 13 is affixed on the main body 16. Alternatively, the vibration attenuating resin layer 14 is applied on a surface of the main body 16. Then, the patch panel 12 is laminated on the main body 16 by interposing the vibration attenuating resin layer 14 between the patch panel 12 and the main body 16 and is then heated to 200° C. While the patch panel 12 and the main body 16 are 200° C., the patch panel 12 and the main body 16 are pressed to each other by using a mold. Thus, the main body 16 is affixed on the patch panel 12. In this case, the patch panel 12 and the main body 16 are pressed together so that the thickness of the adhesive layer 14 will be 0.05 mm, for example.

Figure 2:
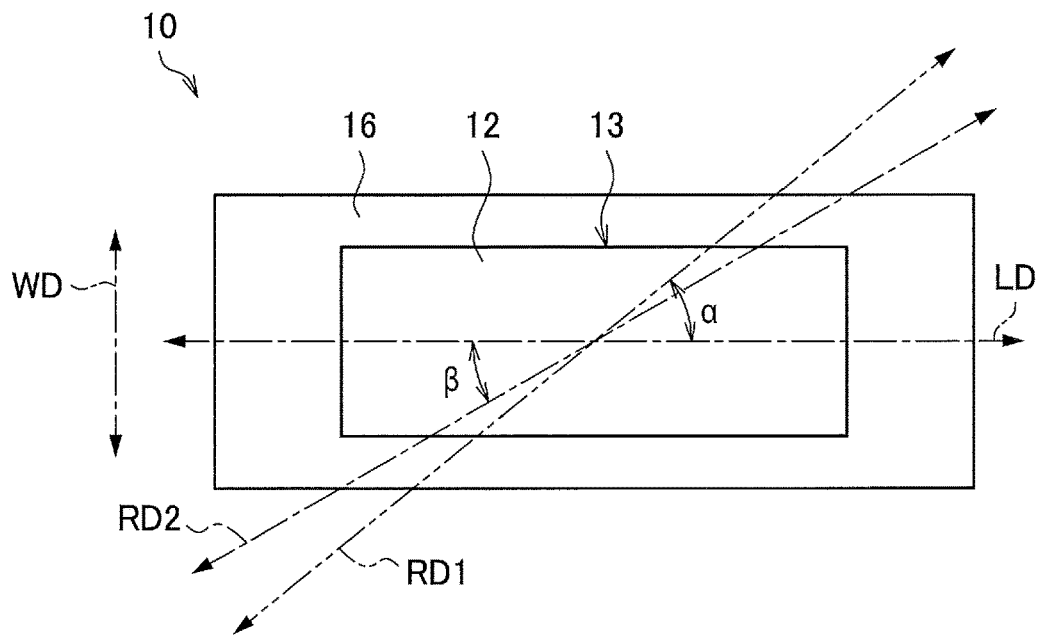
FIG. 2 is a plan view of a panel member.

FIG. 2 is a plan view of the panel member 10. In FIG. 2, the longitudinal direction of the patch panel 12 is indicated by an arrow LD, the width direction of the patch panel 12 is indicated by an arrow WD, the rolling direction of the patch panel 12 is indicated by an arrow RD1, and the rolling direction of the main body 16 is indicated by an arrow RD2. The inventors of the present invention calculated an appropriate value of each of an acute angle α between the longitudinal direction LD and the rolling direction RD1 of the patch panel 12 (hereinafter simply called as an angle α) and an acute angle β between the longitudinal direction LD of the patch panel 12 and the rolling direction RD2 of the main body 16 (hereinafter simply called as an angle β) by simulation described below.

In the simulation, by using an evaluation model (simulation model) having the following structure as the patch panel 12, the adhesive layer 14, and the main body 16, a vibration characteristic in a primary mode when the center of the patch panel 12 vibrates at the largest amplitude was evaluated. Specifically, the vibration characteristic in the primary mode of the evaluation model was evaluated so that a displacement of each of four side surfaces of the main body 16 would be zero. As the patch panel 12, models of three kinds of cold rolled steel plates which have different tensile strengths from each other were used.

(Structure of Evaluation Model)
Patch Panel
    Thickness (mm): 0.5
    Length (mm): 200
    Width (mm): 100
    Material: Cold rolled steel plate
    Tensile strength (MPa): 450, 595, 789
Adhesive Layer
    Thickness (mm): 0.05 mm
    Material: Epoxy resin
Main Panel
    Thickness (mm): 0.5
    Length (mm): 250
    Width (mm): 125
    Material: Cold rolled steel plate
    Tensile strength (MPa): 455

In the evaluation model, Young's modulus was specified in each of the patch panel 12 and the main body 16. In this simulation, the Young's modulus of the cold rolled steel plate that was actually used was measured, and the Young's modulus was specified so as to have anisotropy in each of the patch panel 12 and the main body 16.

Figure 3:
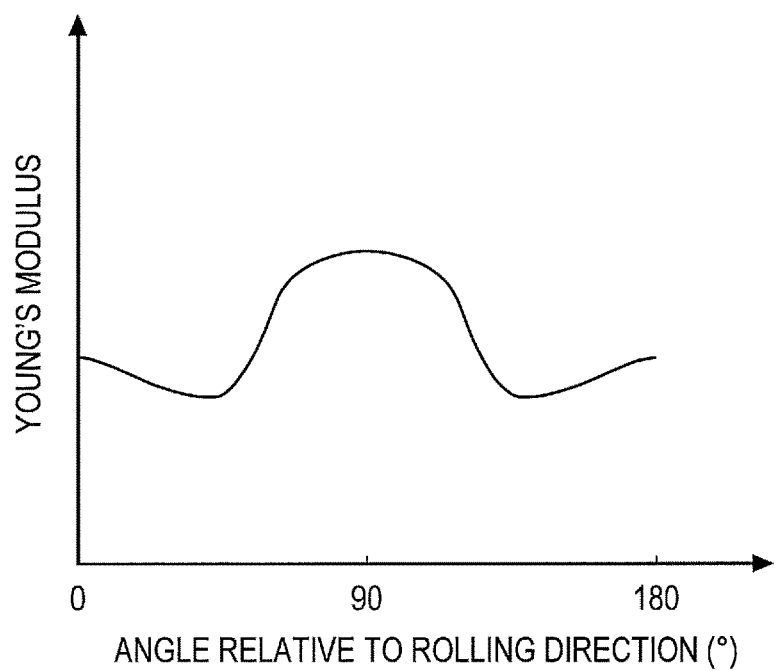
FIG. 3 is a graph for explaining anisotropy in Young's modulus of a patch panel.
Figure 4A:
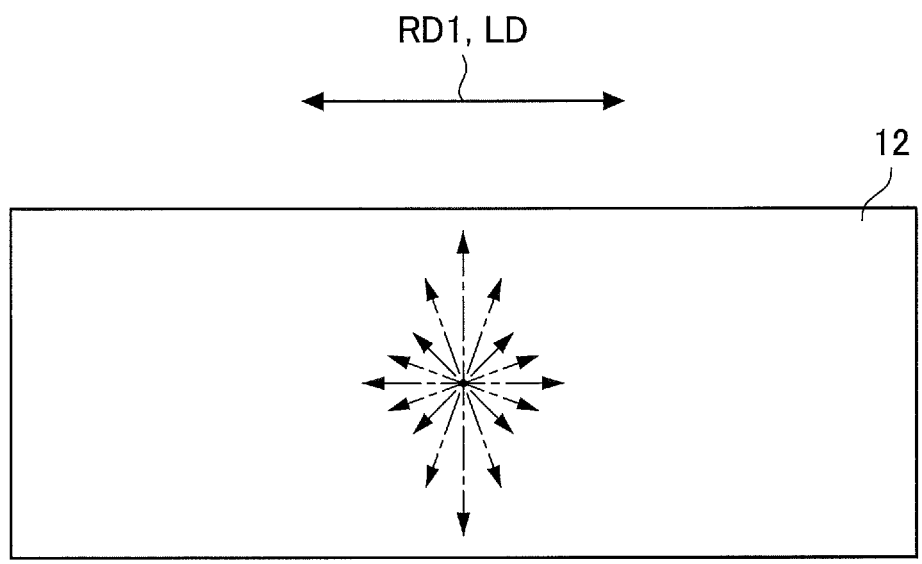
FIG. 4A illustrates anisotropy in Young's modulus of a patch panel.
Figure 4B:
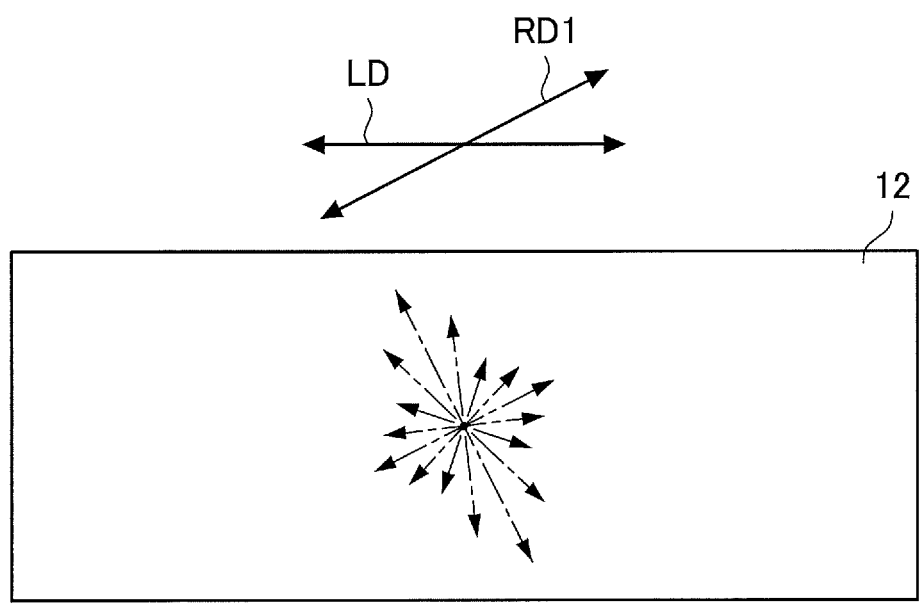
FIG. 4B illustrates anisotropy in Young's modulus of a patch panel.

FIGS. 3, 4A, and 4B illustrate anisotropy of the Young's modulus that was applied to the patch panel 12 in the evaluation model. Specifically, FIG. 3 is a graph showing a relationship between the Young's modulus and the rolling direction RD1 at a freely selected position of the patch panel 12. FIG. 4A is a plan view showing a patch panel 12, in which the longitudinal direction LD corresponds to the rolling direction RD1, and FIG. 4B is a plan view showing a patch panel 12, in which the longitudinal direction LD differs from the rolling direction RD1. FIG. 4 shows the Young's modulus in any direction at a center point of the patch panel 12 by an alternate long and short dashed line. FIGS. 3 and 4 illustrate the anisotropy of the Young's modulus of the patch panel 12 in an easily understandable way and does not correctly illustrate the Young's modulus which was actually applied in the simulation.

As shown in FIGS. 3, 4A, and 4B, in the evaluation model, assuming that the rolling direction RD1 was the front and back direction, the Young's modulus of the patch panel 12 was set so that the Young's modulus in a direction that was tilted relative to each of the front and back direction and the right and left direction by approximately 45 degrees would be lower than the Young's modulus in each of the front and back direction and the right and left direction. In addition, the Young's modulus of the patch panel 12 was set so as to be symmetric to the front and back direction and the right and left direction. Details are not described, but, also in the main body 16, assuming that the rolling direction RD2 (refer to FIG. 2) was the front and back direction, the Young's modulus was set so that the Young's modulus in a direction that was tilted relative to each of the front and back direction and the right and left direction by 45 degrees would be lower than the Young's modulus in each of the front and back direction and the right and left direction. In addition, the Young's modulus of the main body 16 also was set so as to be symmetric to the front and back direction and the right and left direction. In this simulation, Young's modulus was set with respect to each of a steel plate having a tensile strength of 450 MPa, a steel plate having a tensile strength of 455 MPa, a steel plate having a tensile strength of 595 MPa, and a steel plate having a tensile strength of 789 MPa.

As described above, in this simulation, the vibration characteristic (natural frequency in a primary mode) of the evaluation model was evaluated so that the displacements of the four side surfaces of the main body 16 would be zero. In this case, the vibration characteristic of the evaluation model is affected by the Young's modulus of the patch panel 12 and the main body 16 in the longitudinal direction LD. Here, the Young's modulus of the panel member 10 in the longitudinal direction LD is described by referring to FIGS. 2 and 5. It should be noted that the rolling direction RD1 of the patch panel 12 is the same in both of the panel member 10 shown in FIG. 2 and the panel member 10 shown in FIG. 5, but the rolling direction RD2 of the main body 16 differs between the panel member 10 shown in FIG. 2 and the panel member 10 shown in FIG. 5.

As described above, assuming that the rolling direction RD2 of the main body 16 is the front and back direction, the Young's modulus of the main body 16 is symmetric to the front and back direction and the right and left direction. Therefore, when the angle β shown in FIG. 2 is equal to the angle β shown in FIG. 5, the Young's modulus of the main body 16 shown in FIG. 2 is equal to the Young's modulus of the main body 16 shown in FIG. 5 in the longitudinal direction LD. Accordingly, the sum of the Young's modulus of the patch panel 12 and the main body 16 in the longitudinal direction LD is the same in both of the panel member 10 shown in FIG. 2 and the panel member 10 shown in FIG. 5. That is, the angle between the rolling directions RD1 and RD2 differs between the panel member 10 shown in FIG. 2 and the panel member 10 shown in FIG. 5, but the Young's modulus of the panel member 10 in the longitudinal direction LD is the same in both of the panel member 10 shown in FIG. 2 and the panel member 10 shown in FIG. 5.

Figure 5:
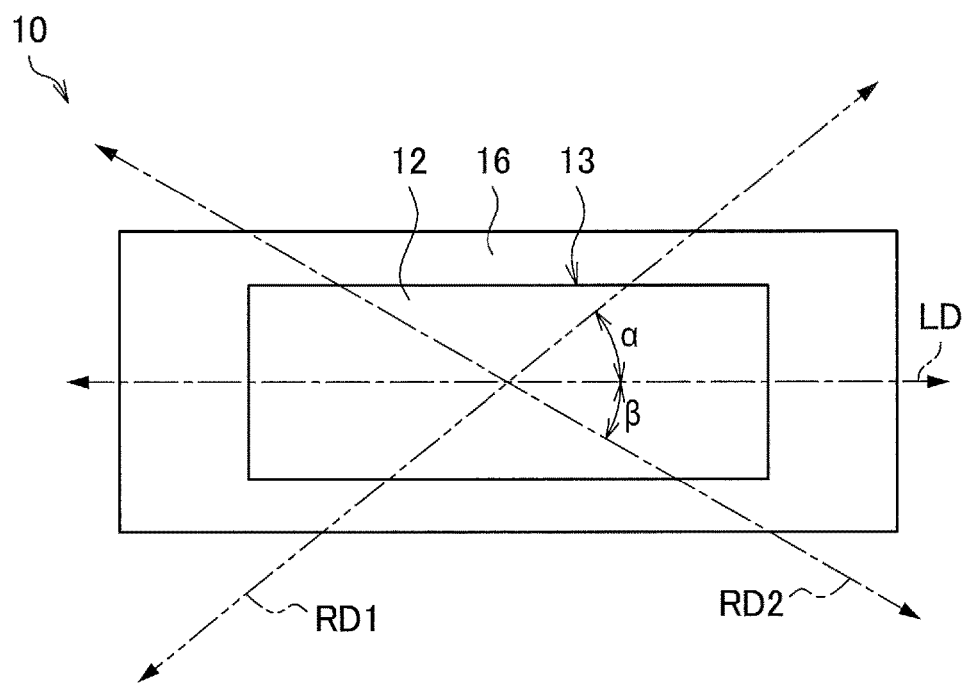
FIG. 5 is a plan view of a panel member.

Specifically, for example, when the angle β shown in FIG. 2 and the angle β shown in FIG. 5 are equal to each other, the vibration characteristic when the angle α is set at 0 degree, 12 degrees, 25 degrees, 29 degrees, 31 degrees, 38 degrees, 45 degrees, 57 degrees, 68 degrees, 71 degrees, or 90 degrees in the panel member 10 shown in FIG. 2 is the same as the vibration characteristic when the angle α is set at 0 degree, 12 degrees, 25 degrees, 29 degrees, 31 degrees, 38 degrees, 45 degrees, 57 degrees, 68 degrees, 71 degrees, or 90 degrees in the panel member 10 shown in FIG. 5, respectively. Thus, in the simulation, the vibration characteristic of the panel member 10 depends on the angle α and the angle β and does not depend on the angle between the rolling directions RD1 and RD2. Therefore, in the results of the simulation described below, the angle between the rolling directions RD1 and RD2 is not considered.

First, results of the simulation in a case of using the steel plate with a tensile strength of 450 MPa as the patch panel 12 are shown in the following Tables 1 to 3. As shown in Table 1, in the evaluation models Nos. A1-1 to A1-11, the angle β between the longitudinal direction LD of the patch panel 12 and the rolling direction RD2 of the main body 16 was set at 0 degree. Then, by setting the angle α between the longitudinal direction LD and the rolling direction RD1 of the patch panel 12 at 0 degree, 12 degrees, 25 degrees, 29 degrees, 31 degrees, 38 degrees, 45 degrees, 57 degrees, 68 degrees, 71 degrees, or 90 degrees, the natural frequency in the primary mode of each of the evaluation models was evaluated.

Similarly, the angle β was set at 27 degrees in each of the evaluation models Nos. A2-1 to A2-11 (refer to Table 1), the angle β was set at 32 degrees in each of the evaluation models Nos. A3-1 to A3-11 (refer to Table 1), the angle β was set at 45 degrees in each of the evaluation models Nos. A4-1 to A4-11 (refer to Table 2), and the angle β was set at 68 degrees in each of the evaluation models Nos. A5-1 to A5-11 (refer to Table 2). Also, the angle β was set at 72 degrees in each of the evaluation models Nos. A6-1 to A6-11 (refer to Table 3), and the angle β was set at 90 degrees in each of the evaluation models Nos. A7-1 to A7-11 (refer to Table 3). Then, by setting the angle α at 0 degree, 12 degrees, 25 degrees, 29 degrees, 31 degrees, 38 degrees, 45 degrees, 57 degrees, 68 degrees, 71 degrees, or 90 degrees, the natural frequency in the primary mode of each of the evaluation models was evaluated. Moreover, results of the simulation in a case of using the steel plate with a tensile strength of 595 MPa as the patch panel 12 (No. B1-1 to B7-11) are shown in the following Tables 4 to 6, and results of the simulation in a case of using the steel plate with a tensile strength of 789 MPa as the patch panel 12 (No. C1-1 to C7-11) are shown in the following Tables 7 to 9. In these simulations, the angle α and the angle β of each of the evaluation models were set as in the case of the evaluation models Nos. A1-1 to A7-11. It should be noted that each of the natural frequencies in the primary mode shown in Tables 1 to 9 has a dimensionless value based on the natural frequency in the primary mode of a reference model which is described below. The reference model is a simulation model of a plate of a cold rolled steel which has the same dimensions as the evaluation model, and the reference model was formed with respect to each of the eleven evaluation models, in which the angle β and the tensile strength of the patch panel are the same. The angle between the longitudinal direction and the rolling direction of the reference model is equal to the angle β of the corresponding evaluation model. For example, a reference model, in which the angle between the longitudinal direction and the rolling direction is 0 degree, was formed with respect to the evaluation models Nos. A1-1 to A1-11, and a reference model, in which the angle between the longitudinal direction and the rolling direction is 27 degrees, was formed with respect to the evaluation models Nos. A2-1 to A2-11. It should be noted that the tensile strength of the reference models was equal to the tensile strength (455 MPa) of the main panel of the evaluation models.

TABLE 1

| Model No. | Angle α (°) | Angle β (°) | * Natural frequency in primary mode |
|---|---|---|---|
| A1-1 | 0 | 0 | 0.99 |
| A1-2 | 12 | 0 | 1.05 |
| A1-3 | 25 | 0 | 1.09 |
| A1-4 | 29 | 0 | 1.10 |
| A1-5 | 31 | 0 | 1.16 |
| A1-6 | 38 | 0 | 1.17 |
| A1-7 | 45 | 0 | 1.23 |
| A1-8 | 57 | 0 | 1.19 |
| A1-9 | 68 | 0 | 1.15 |

TABLE 1-continued

| Model No. | Angle α (°) | Angle β (°) | * Natural frequency in primary mode |
|---|---|---|---|
| A1-10 | 71 | 0 | 1.08 |
| A1-11 | 90 | 0 | 1.04 |
| A2-1 | 0 | 27 | 1.11 |
| A2-2 | 12 | 27 | 1.14 |
| A2-3 | 25 | 27 | 1.16 |
| A2-4 | 29 | 27 | 1.21 |
| A2-5 | 31 | 27 | 1.28 |
| A2-6 | 38 | 27 | 1.30 |
| A2-7 | 45 | 27 | 1.32 |
| A2-8 | 57 | 27 | 1.31 |
| A2-9 | 68 | 27 | 1.29 |
| A2-10 | 71 | 27 | 1.21 |
| A2-11 | 90 | 27 | 1.16 |
| A3-1 | 0 | 32 | 1.20 |
| A3-2 | 12 | 32 | 1.21 |
| A3-3 | 25 | 32 | 1.26 |
| A3-4 | 29 | 32 | 1.28 |
| A3-5 | 31 | 32 | 1.36 |
| A3-6 | 38 | 32 | 1.39 |
| A3-7 | 45 | 32 | 1.42 |
| A3-8 | 57 | 32 | 1.40 |
| A3-9 | 68 | 32 | 1.37 |
| A3-10 | 71 | 32 | 1.29 |
| A3-11 | 90 | 32 | 1.26 |

Patch panel: steel plate having a tensile strength of 450 MPa
Main panel: steel plate having a tensile strength of 455 MPa
* The natural frequency in the primary mode is a dimensionless value based on the natural frequency in the primary mode of the reference model (a plate of a cold rolled steel which has an angle between the longitudinal direction and the rolling direction that is the same as the angle β of the corresponding evaluation model and has a tensile strength of 455 MPa) which has the same dimension as the evaluation model

TABLE 2

| Model No. | Angle α (°) | Angle β (°) | * Natural frequency in primary mode |
|---|---|---|---|
| A4-1 | 0 | 45 | 1.22 |
| A4-2 | 12 | 45 | 1.27 |
| A4-3 | 25 | 45 | 1.29 |
| A4-4 | 29 | 45 | 1.30 |
| A4-5 | 31 | 45 | 1.38 |
| A4-6 | 38 | 45 | 1.43 |
| A4-7 | 45 | 45 | 1.50 |
| A4-8 | 57 | 45 | 1.46 |
| A4-9 | 68 | 45 | 1.40 |
| A4-10 | 71 | 45 | 1.30 |
| A4-11 | 90 | 45 | 1.29 |
| A5-1 | 0 | 68 | 1.20 |
| A5-2 | 12 | 68 | 1.21 |
| A5-3 | 25 | 68 | 1.27 |
| A5-4 | 29 | 68 | 1.28 |
| A5-5 | 31 | 68 | 1.35 |
| A5-6 | 38 | 68 | 1.37 |
| A5-7 | 45 | 68 | 1.43 |
| A5-8 | 57 | 68 | 1.40 |
| A5-9 | 68 | 68 | 1.37 |
| A5-10 | 71 | 68 | 1.30 |
| A5-11 | 90 | 68 | 1.25 |

Patch panel: steel plate having a tensile strength of 450 MPa
Main panel: steel plate having a tensile strength of 455 MPa
* The natural frequency in the primary mode is a dimensionless value based on the natural frequency in the primary mode of the reference model (a plate of a cold rolled steel which has an angle between the longitudinal direction and the rolling direction that is the same as the angle β of the corresponding evaluation model and has a tensile strength of 455 MPa) which has the same dimension as the evaluation model

TABLE 3

| Model No. | Angle α (°) | Angle β (°) | * Natural frequency in primary mode |
|---|---|---|---|
| A6-1 | 0 | 72 | 1.05 |
| A6-2 | 12 | 72 | 1.10 |
| A6-3 | 25 | 72 | 1.14 |

TABLE 3-continued

| Model No. | Angle α (°) | Angle β (°) | *Natural frequency in primary mode |
|---|---|---|---|
| A6-4 | 29 | 72 | 1.15 |
| A6-5 | 31 | 72 | 1.28 |
| A6-6 | 38 | 72 | 1.31 |
| A6-7 | 45 | 72 | 1.36 |
| A6-8 | 57 | 72 | 1.35 |
| A6-9 | 68 | 72 | 1.30 |
| A6-10 | 71 | 72 | 1.21 |
| A6-11 | 90 | 72 | 1.17 |
| A7-1 | 0 | 90 | 1.02 |
| A7-2 | 12 | 90 | 1.08 |
| A7-3 | 25 | 90 | 1.15 |
| A7-4 | 29 | 90 | 1.16 |
| A7-5 | 31 | 90 | 1.24 |
| A7-6 | 38 | 90 | 1.25 |
| A7-7 | 45 | 90 | 1.29 |
| A7-8 | 57 | 90 | 1.27 |
| A7-9 | 68 | 90 | 1.25 |
| A7-10 | 71 | 90 | 1.19 |
| A7-11 | 90 | 90 | 1.15 |

Patch panel: steel plate having a tensile strength of 450 MPa
Main panel: steel plate having a tensile strength of 455 MPa
* The natural frequency in the primary mode is a dimensionless value based on the natural frequency in the primary mode of the reference model (a plate of a cold rolled steel which has an angle between the longitudinal direction and the rolling direction that is the same as the angle β of the corresponding evaluation model and has a tensile strength of 455 MPa) which has the same dimension as the evaluation model

TABLE 4

| Model No. | Angle α (°) | Angle β (°) | *Natural frequency in primary mode |
|---|---|---|---|
| B1-1 | 0 | 0 | 1.00 |
| B1-2 | 12 | 0 | 1.05 |
| B1-3 | 25 | 0 | 1.09 |
| B1-4 | 29 | 0 | 1.10 |
| B1-5 | 31 | 0 | 1.20 |
| B1-6 | 38 | 0 | 1.20 |
| B1-7 | 45 | 0 | 1.25 |
| B1-8 | 57 | 0 | 1.21 |
| B1-9 | 68 | 0 | 1.20 |
| B1-10 | 71 | 0 | 1.10 |
| B1-11 | 90 | 0 | 1.03 |
| B2-1 | 0 | 27 | 1.12 |
| B2-2 | 12 | 27 | 1.15 |
| B2-3 | 25 | 27 | 1.19 |
| B2-4 | 29 | 27 | 1.20 |
| B2-5 | 31 | 27 | 1.31 |
| B2-6 | 38 | 27 | 1.32 |
| B2-7 | 45 | 27 | 1.37 |
| B2-8 | 57 | 27 | 1.34 |
| B2-9 | 68 | 27 | 1.31 |
| B2-10 | 71 | 27 | 1.21 |
| B2-11 | 90 | 27 | 1.15 |
| B3-1 | 0 | 32 | 1.20 |
| B3-2 | 12 | 32 | 1.21 |
| B3-3 | 25 | 32 | 1.25 |
| B3-4 | 29 | 32 | 1.30 |
| B3-5 | 31 | 32 | 1.40 |
| B3-6 | 38 | 32 | 1.42 |
| B3-7 | 45 | 32 | 1.45 |
| B3-8 | 57 | 32 | 1.42 |
| B3-9 | 68 | 32 | 1.40 |
| B3-10 | 71 | 32 | 1.30 |
| B3-11 | 90 | 32 | 1.27 |

Patch panel: steel plate having a tensile strength of 595 MPa
Main panel: steel plate having a tensile strength of 455 MPa
* The natural frequency in the primary mode is a dimensionless value based on the natural frequency in the primary mode of the reference model (a plate of a cold rolled steel which has an angle between the longitudinal direction and the rolling direction that is the same as the angle β of the corresponding evaluation model and has a tensile strength of 455 MPa) which has the same dimension as the evaluation model

TABLE 5

| Model No. | Angle α (°) | Angle β (°) | *Natural frequency in primary mode |
|---|---|---|---|
| B4-1 | 0 | 45 | 1.23 |
| B4-2 | 12 | 45 | 1.28 |
| B4-3 | 25 | 45 | 1.29 |
| B4-4 | 29 | 45 | 1.30 |
| B4-5 | 31 | 45 | 1.42 |
| B4-6 | 38 | 45 | 1.45 |
| B4-7 | 45 | 45 | 1.52 |
| B4-8 | 57 | 45 | 1.48 |
| B4-9 | 68 | 45 | 1.42 |
| B4-10 | 71 | 45 | 1.30 |
| B4-11 | 90 | 45 | 1.28 |
| B5-1 | 0 | 68 | 1.20 |
| B5-2 | 12 | 68 | 1.22 |
| B5-3 | 25 | 68 | 1.27 |
| B5-4 | 29 | 68 | 1.27 |
| B5-5 | 31 | 68 | 1.38 |
| B5-6 | 38 | 68 | 1.41 |
| B5-7 | 45 | 68 | 1.43 |
| B5-8 | 57 | 68 | 1.41 |
| B5-9 | 68 | 68 | 1.40 |
| B5-10 | 71 | 68 | 1.28 |
| B5-11 | 90 | 68 | 1.26 |

Patch panel: steel plate having a tensile strength of 595 MPa
Main panel: steel plate having a tensile strength of 455 MPa
* The natural frequency in the primary mode is a dimensionless value based on the natural frequency in the primary mode of the reference model (a plate of a cold rolled steel which has an angle between the longitudinal direction and the rolling direction that is the same as the angle β of the corresponding evaluation model and has a tensile strength of 455 MPa) which has the same dimension as the evaluation model

TABLE 6

| Model No. | Angle α (°) | Angle β (°) | *Natural frequency in primary mode |
|---|---|---|---|
| B6-1 | 0 | 72 | 1.06 |
| B6-2 | 12 | 72 | 1.09 |
| B6-3 | 25 | 72 | 1.13 |
| B6-4 | 29 | 72 | 1.16 |
| B6-5 | 31 | 72 | 1.32 |
| B6-6 | 38 | 72 | 1.34 |
| B6-7 | 45 | 72 | 1.36 |
| B6-8 | 57 | 72 | 1.34 |
| B6-9 | 68 | 72 | 1.32 |
| B6-10 | 71 | 72 | 1.22 |
| B6-11 | 90 | 72 | 1.18 |
| B7-1 | 0 | 90 | 1.03 |
| B7-2 | 12 | 90 | 1.09 |
| B7-3 | 25 | 90 | 1.16 |
| B7-4 | 29 | 90 | 1.16 |
| B7-5 | 31 | 90 | 1.26 |
| B7-6 | 38 | 90 | 1.27 |
| B7-7 | 45 | 90 | 1.30 |
| B7-8 | 57 | 90 | 1.28 |
| B7-9 | 68 | 90 | 1.27 |
| B7-10 | 71 | 90 | 1.17 |
| B7-11 | 90 | 90 | 1.16 |

Patch panel: steel plate having a tensile strength of 595 MPa
Main panel: steel plate having a tensile strength of 455 MPa
* The natural frequency in the primary mode is a dimensionless value based on the natural frequency in the primary mode of the reference model (a plate of a cold rolled steel which has an angle between the longitudinal direction and the rolling direction that is the same as the angle β of the corresponding evaluation model and has a tensile strength of 455 MPa) which has the same dimension as the evaluation model

TABLE 7

| Model No. | Angle α (°) | Angle β (°) | *Natural frequency in primary mode |
|---|---|---|---|
| C1-1 | 0 | 0 | 1.00 |
| C1-2 | 12 | 0 | 1.06 |
| C1-3 | 25 | 0 | 1.10 |
| C1-4 | 29 | 0 | 1.11 |
| C1-5 | 31 | 0 | 1.21 |

TABLE 7-continued

| Model No. | Angle α (°) | Angle β (°) | *Natural frequency in primary mode |
|---|---|---|---|
| C1-6 | 38 | 0 | 1.22 |
| C1-7 | 45 | 0 | 1.26 |
| C1-8 | 57 | 0 | 1.21 |
| C1-9 | 68 | 0 | 1.20 |
| C1-10 | 71 | 0 | 1.09 |
| C1-11 | 90 | 0 | 1.03 |
| C2-1 | 0 | 27 | 1.12 |
| C2-2 | 12 | 27 | 1.14 |
| C2-3 | 25 | 27 | 1.18 |
| C2-4 | 29 | 27 | 1.19 |
| C2-5 | 31 | 27 | 1.32 |
| C2-6 | 38 | 27 | 1.33 |
| C2-7 | 45 | 27 | 1.38 |
| C2-8 | 57 | 27 | 1.35 |
| C2-9 | 68 | 27 | 1.32 |
| C2-10 | 71 | 27 | 1.22 |
| C2-11 | 90 | 27 | 1.15 |
| C3-1 | 0 | 32 | 1.20 |
| C3-2 | 12 | 32 | 1.21 |
| C3-3 | 25 | 32 | 1.25 |
| C3-4 | 29 | 32 | 1.30 |
| C3-5 | 31 | 32 | 1.40 |
| C3-6 | 38 | 32 | 1.43 |
| C3-7 | 45 | 32 | 1.45 |
| C3-8 | 57 | 32 | 1.42 |
| C3-9 | 68 | 32 | 1.40 |
| C3-10 | 71 | 32 | 1.30 |
| C3-11 | 90 | 32 | 1.28 |

Patch panel: steel plate having a tensile strength of 789 MPa
Main panel: steel plate having a tensile strength of 455 MPa
* The natural frequency in the primary mode is a dimensionless value based on the natural frequency in the primary mode of the reference model (a plate of a cold rolled steel which has an angle between the longitudinal direction and the rolling direction that is the same as the angle β of the corresponding evaluation model and has a tensile strength of 455 MPa) which has the same dimension as the evaluation model

TABLE 8

| Model No. | Angle α (°) | Angle β (°) | *Natural frequency in primary mode |
|---|---|---|---|
| C4-1 | 0 | 45 | 1.23 |
| C4-2 | 12 | 45 | 1.28 |
| C4-3 | 25 | 45 | 1.29 |
| C4-4 | 29 | 45 | 1.30 |
| C4-5 | 31 | 45 | 1.43 |
| C4-6 | 38 | 45 | 1.45 |
| C4-7 | 45 | 45 | 1.53 |
| C4-8 | 57 | 45 | 1.49 |
| C4-9 | 68 | 45 | 1.42 |
| C4-10 | 71 | 45 | 1.30 |
| C4-11 | 90 | 45 | 1.28 |
| C5-1 | 0 | 68 | 1.20 |
| C5-2 | 12 | 68 | 1.22 |
| C5-3 | 25 | 68 | 1.25 |
| C5-4 | 29 | 68 | 1.26 |
| C5-5 | 31 | 68 | 1.40 |
| C5-6 | 38 | 68 | 1.41 |
| C5-7 | 45 | 68 | 1.43 |
| C5-8 | 57 | 68 | 1.41 |
| C5-9 | 68 | 68 | 1.40 |
| C5-10 | 71 | 68 | 1.30 |
| C5-11 | 90 | 68 | 1.27 |

Patch panel: steel plate having a tensile strength of 789 MPa
Main panel: steel plate having a tensile strength of 455 MPa
* The natural frequency in the primary mode is a dimensionless value based on the natural frequency in the primary mode of the reference model (a plate of a cold rolled steel which has an angle between the longitudinal direction and the rolling direction that is the same as the angle β of the corresponding evaluation model and has a tensile strength of 455 MPa) which has the same dimension as the evaluation model

TABLE 9

| Model No. | Angle α (°) | Angle β (°) | *Natural frequency in primary mode |
|---|---|---|---|
| C6-1 | 0 | 72 | 1.06 |
| C6-2 | 12 | 72 | 1.09 |
| C6-3 | 25 | 72 | 1.13 |
| C6-4 | 29 | 72 | 1.17 |
| C6-5 | 31 | 72 | 1.31 |
| C6-6 | 38 | 72 | 1.35 |
| C6-7 | 45 | 72 | 1.37 |
| C6-8 | 57 | 72 | 1.35 |
| C6-9 | 68 | 72 | 1.33 |
| C6-10 | 71 | 72 | 1.20 |
| C6-11 | 90 | 72 | 1.18 |
| C7-1 | 0 | 90 | 1.04 |
| C7-2 | 12 | 90 | 1.10 |
| C7-3 | 25 | 90 | 1.15 |
| C7-4 | 29 | 90 | 1.15 |
| C7-5 | 31 | 90 | 1.27 |
| C7-6 | 38 | 90 | 1.30 |
| C7-7 | 45 | 90 | 1.33 |
| C7-8 | 57 | 90 | 1.31 |
| C7-9 | 68 | 90 | 1.30 |
| C7-10 | 71 | 90 | 1.20 |
| C7-11 | 90 | 90 | 1.17 |

Figure 6:
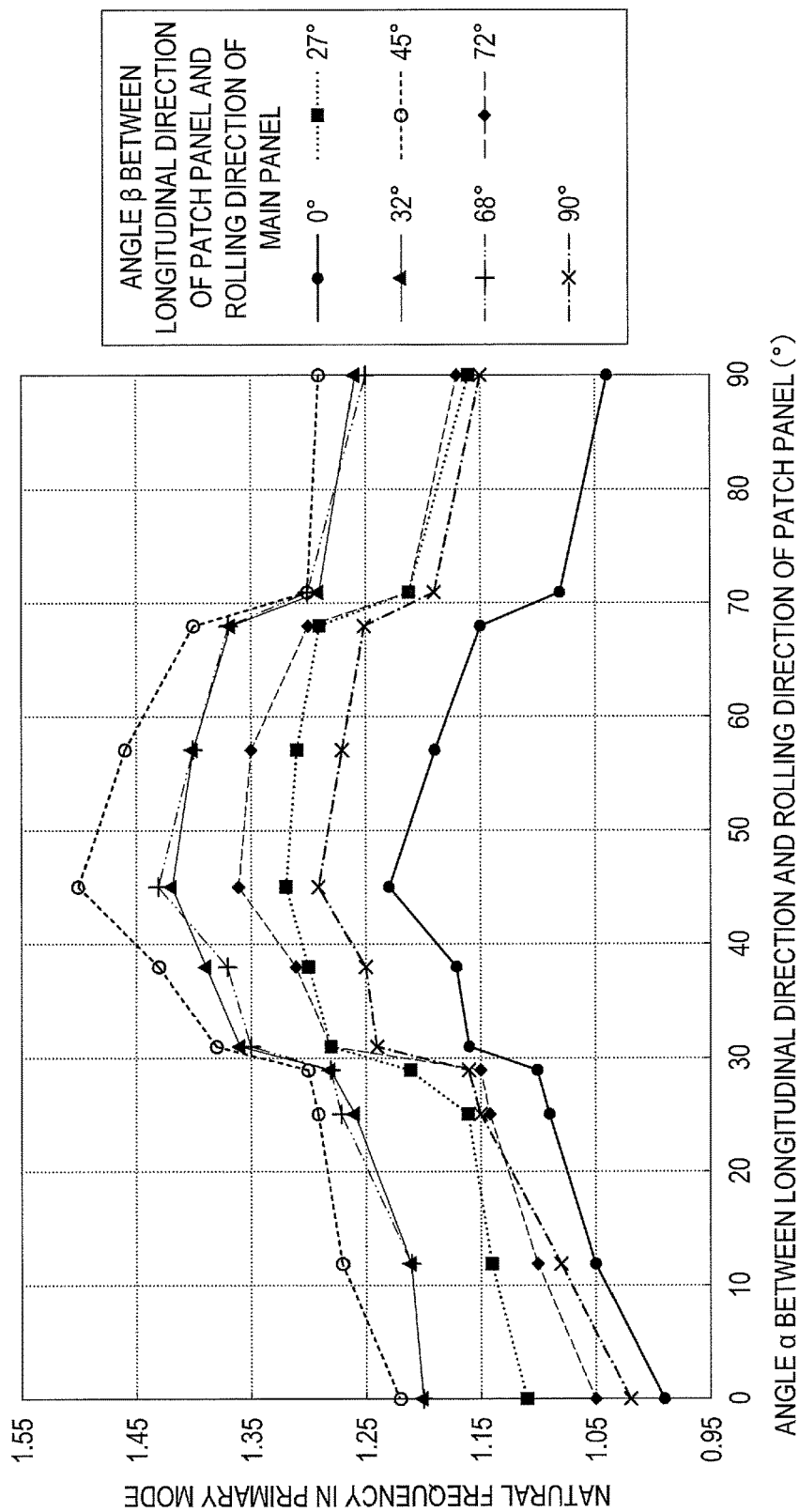
FIG. 6 is a graph showing a result of simulation in a case of using a steel plate having a tensile strength of 450 MPa as a patch panel.
Figure 7:
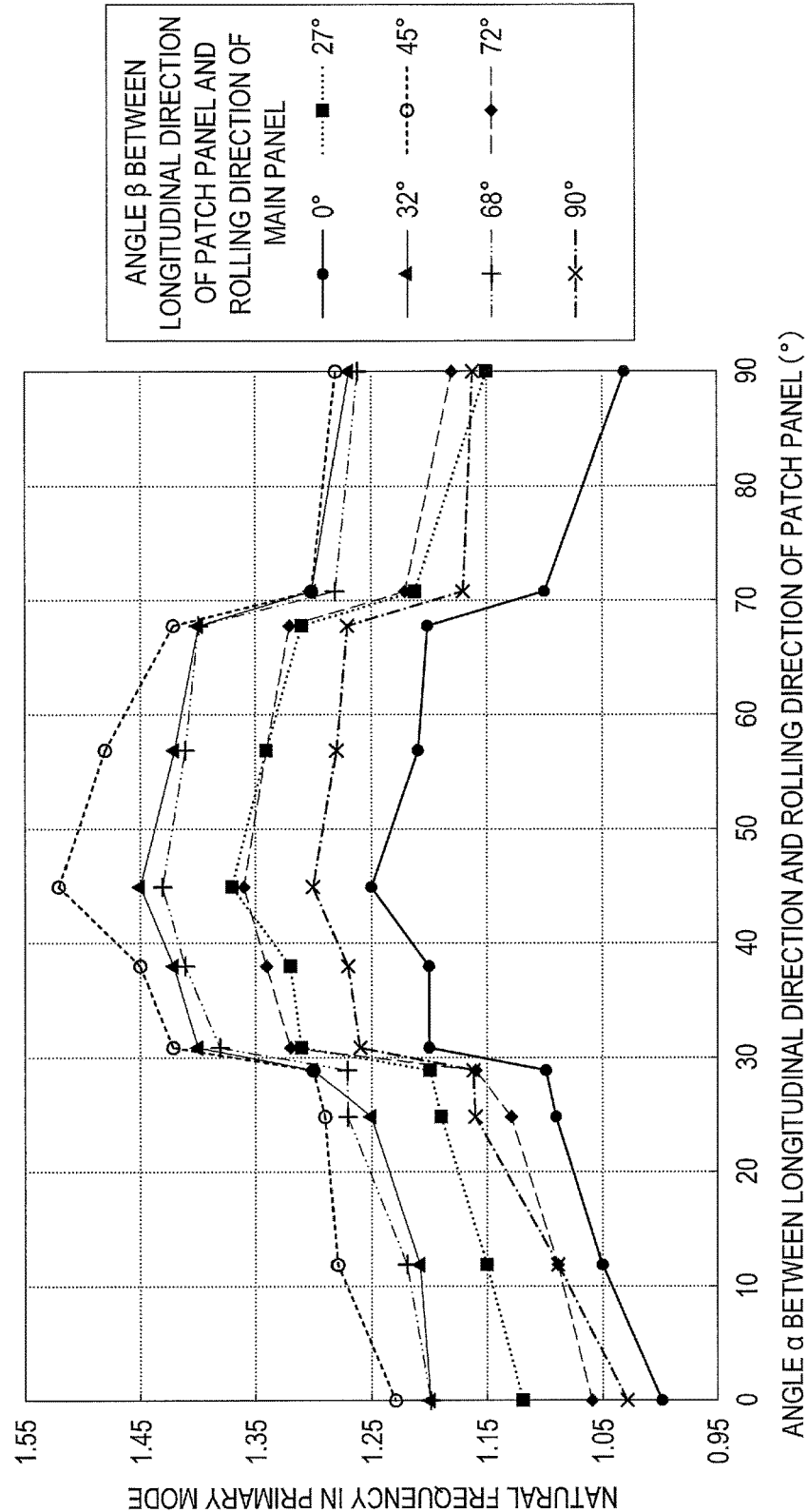
FIG. 7 is a graph showing a result of simulation in a case of using a steel plate having a tensile strength of 595 MPa as a patch panel.
Figure 8:
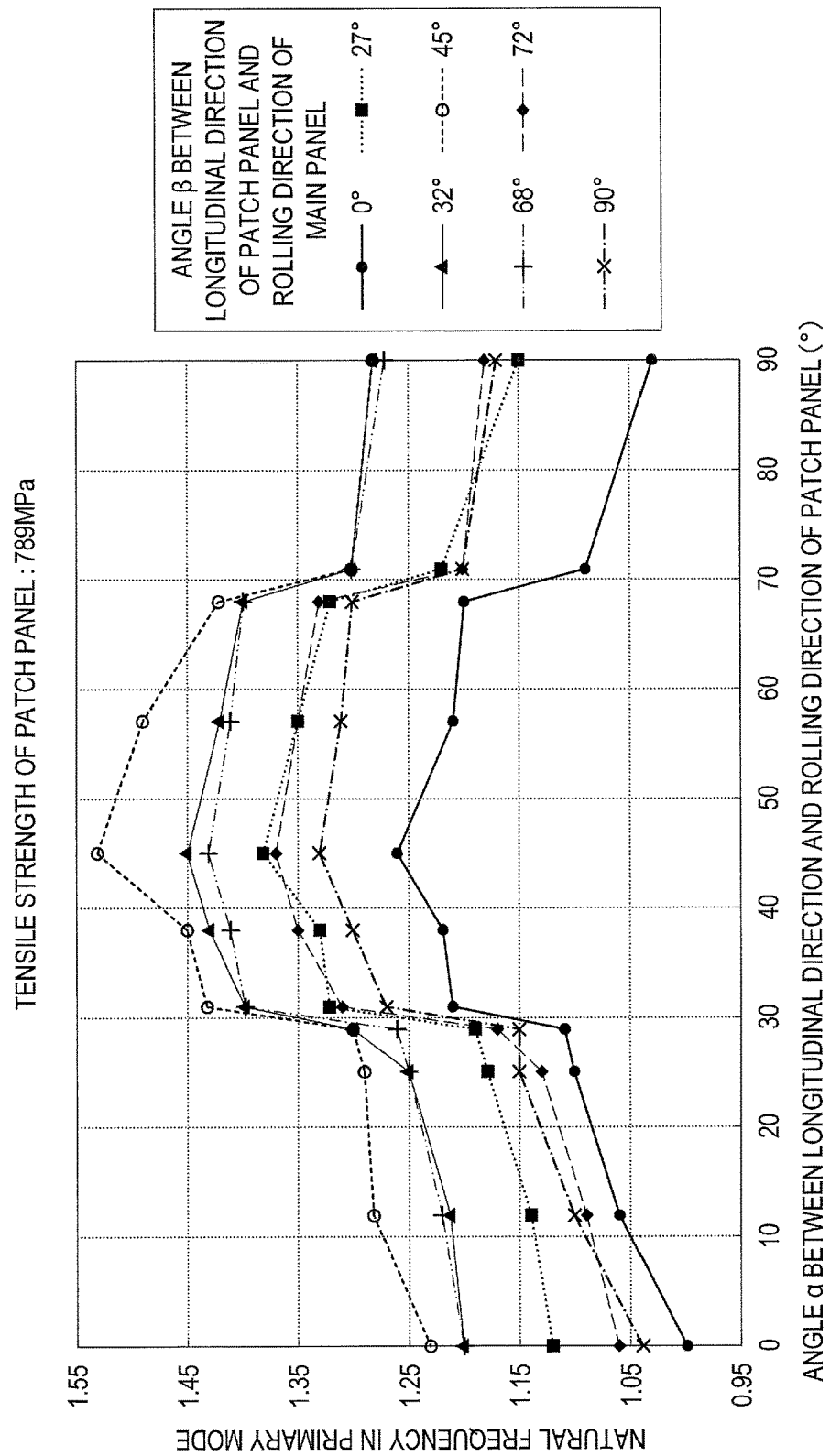
FIG. 8 is a graph showing a result of simulation in a case of using a steel plate having a tensile strength of 789 MPa as a patch panel.

Patch panel: steel plate having a tensile strength of 789 MPa
Main panel: steel plate having a tensile strength of 455 MPa
* The natural frequency in the primary mode is a dimensionless value based on the natural frequency in the primary mode of the reference model (a plate of a cold rolled steel which has an angle between the longitudinal direction and the rolling direction that is the same as the angle β of the corresponding evaluation model and has a tensile strength of 455 MPa) which has the same dimension as the evaluation model First, an appropriate value of the angle α which was determined according to the results of the simulation is described. FIG. 6 is a graph which was formed based on the data shown in Tables 1 to 3 and shows a relationship between the angle α and the natural frequency in the primary mode (dimensionless value) in the evaluation models using the steel plate with a tensile strength of 450 MPa as the patch panel 12. FIG. 7 is a graph which was formed based on the data shown in Tables 4 to 6 and shows a relationship between the angle α and the natural frequency in the primary mode (dimensionless value) in the evaluation models using the steel plate with a tensile strength of 595 MPa as the patch panel 12. FIG. 8 is a graph which was formed based on the data shown in Tables 7 to 9 and shows a relationship between the angle α and the natural frequency in the primary mode (dimensionless value) in the evaluation models using the steel plate with a tensile strength of 789 MPa as the patch panel 12.

As shown in FIG. 6, in the evaluation models using the steel plate with a tensile strength of 450 MPa as the patch panel 12, the natural frequency in the primary mode was low in the range, in which the angle α was 29 degrees or less or 71 degrees or more, regardless of the value of the angle β. Similarly, as shown in FIGS. 7 and 8, also in the evaluation models using the steel plate with a tensile strength of 595 MPa or 789 MPa as the patch panel 12, the natural frequency in the primary mode was low in the range, in which the angle α was 29 degrees or less or 71 degrees or more, regardless of the value of the angle β. In addition, as shown in FIGS. 6 to 8, the natural frequency in the primary mode of each of the evaluation models was significantly increased in the range, in which the angle α was 31 to 68 degrees, regardless of the value of the angle β. According to these results, the inventors of the present invention specified the angle α of the panel member 10 according to the present invention at 30 to 70 degrees and also specified a more preferable range of the angle α at 31 to 68 degrees. By thus specifying the angle α, the natural frequency in the primary mode of the panel member 10 is made high. That is, the vibration characteristic of the panel member 10 is improved.

In the above simulation, the natural frequency in the primary mode of the evaluation models was low in the range, in which the angle α between the longitudinal direction LD and the rolling direction RD1 of the patch panel 12 was 29 degrees or less or 71 degrees or more. The reason for this can be considered as follows. That is, when the angle α is 29 degrees or less or 71 degrees or more, the difference of the Young's modulus of the patch panel 12 is great between the longitudinal direction LD and the direction orthogonal to the longitudinal direction LD (width direction WD (refer to FIG. 2)). This is clearly shown in FIG. 3. For example, in the main body 16 that is affixed with the patch panel 12 which has Young's modulus in the longitudinal direction LD that is lower than the Young's modulus in the width direction WD, when a natural frequency in a primary mode is generated in an area that is affixed with the patch panel 12, the amount of elastic deformation (elongation amount) of the patch panel 12 with respect to the stress in the longitudinal direction LD is increased. Moreover, the effect of the stress (elongation) in the longitudinal direction LD of the patch panel 12 on the shrinkage in the width direction WD is also increased, whereby the amount of shrinkage of the patch panel 12 in the width direction WD is increased. Thus, the stress in the patch panel 12 in the width direction WD is increased, and the difference of the stress between the longitudinal direction LD and the width direction WD is increased. Therefore, a difference is generated in the bending moment of the patch panel 12 between the longitudinal direction LD and the width direction WD, thereby facilitating antiplane deformation of the panel member 10. As a result, the natural frequency in the primary mode of the panel member 10 is decreased.

In other words, the likelihood of the vibration of the primary mode of the patch panel 12 depends on the Young's modulus in the longitudinal direction LD and in the width direction WD, but when the difference of the Young's modulus between the longitudinal direction LD and the width direction WD is great, the likelihood of the vibration of the patch panel 12 differs between the longitudinal direction LD and the width direction WD, whereby a stress component which facilitates the deformation toward the outside is generated in the patch panel 12. As shown in FIG. 3, the difference of the Young's modulus between the longitudinal direction LD and the width direction WD is large in the range, in which the angle α between the longitudinal direction LD and the rolling direction RD1 is 29 degrees or less or 71 degrees or more. Then, the natural frequency is decreased by the stress component compared with the case, in which the Young's modulus is the same in both of the longitudinal direction LD and the width direction WD.

When the steel plate having a tensile strength of 450 MPa was used as the patch panel 12, the minimum value of the natural frequency of the evaluation model, in which the angle α was set within the range of the present invention (30 to 70 degrees), was approximately 3.8 to 6.2% higher than the maximum value of the natural frequency of the evaluation model, in which the angle α was set at a value outside the range of the present invention.

More specifically, as shown in Table 1, the minimum value of the natural frequency was 1.15 of the model No. A1-9 among the models Nos. A1-5 to A1-9, in which the angle α was within the range of the present invention. On the other hand, the maximum value of the natural frequency was 1.10 of the model No. A1-4 among the models Nos. A1-1 to A1-4, A1-10, and A1-11, in which the angle α was outside the range of the present invention. Therefore, the natural frequency of the model No. A1-9 was approximately 4.5% higher than the natural frequency of the model No. A1-4.

Similarly, the natural frequency (1.28) of the model No. A2-5 was approximately 5.8% higher than the natural frequency (1.21) of each of the models Nos. A2-4 and A2-10, and the natural frequency (1.36) of the model No. A3-5 was approximately 5.4% higher than the natural frequency (1.29) of the model No. A3-10. As shown in Table 2, the natural frequency (1.38) of the model No. A4-5 was approximately 6.2% higher than the natural frequency (1.30) of each of the models Nos. A-4 and A4-10, and the natural frequency (1.35) of the model No. A5-5 was approximately 3.8% higher than the natural frequency (1.30) of the model No. A5-10. As shown in Table 3, the natural frequency (1.28) of the model No. A6-5 was approximately 5.8% higher than the natural frequency (1.21) of the model No. A6-10, and the natural frequency (1.24) of the model No. A7-5 was approximately 4.2% higher than the natural frequency (1.19) of the model No. A7-10.

The models Nos. B1-1 to B7-11, which used the steel plate having a tensile strength of 595 MPa as the patch panel 12, and the models Nos. C1-1 to C7-11, which used the steel plate having a tensile strength of 789 MPa as the patch panel 12, were respectively compared with each other in a manner similar to the embodiment described above. As a result, when the steel plate having a tensile strength of 595 MPa was used as the patch panel 12, the minimum value of the natural frequency of the evaluation model, in which the angle α was set within the range of the present invention, was approximately 7.7 to 9.2% higher than the maximum value of the natural frequency of the evaluation model, in which the angle α was set at a value outside the range of the present invention. When the steel plate having a tensile strength of 789 MPa was used as the patch panel 12, the minimum value of the natural frequency of the evaluation model, in which the angle α was set within the range of the present invention, was approximately 5.8 to 9.2% higher than the maximum value of the natural frequency of the evaluation model, in which the angle α was set at a value outside the range of the present invention.

As described above, in this simulation, a greater effect of the present invention was exhibited when the steel plate having a tensile strength of 595 MPa or 789 MPa was used, compared with the case of using the steel plate with a tensile strength of 450 MPa as the patch panel 12. According to this result, the greater effect of the present invention is exhibited when a steel plate having a tensile strength of 590 MPa or more class is used as the patch panel 12. In a steel plate having a high tensile strength (for example, a steel plate having a tensile strength of 590 MPa or more), anisotropy in the Young's modulus is great due to the chemical composition and the rolling condition of the steel plate. Therefore, in the case of using a steel with a high tensile strength as the patch panel 12, the greater effect of the present invention is exhibited as in the case described above.

Figure 9:
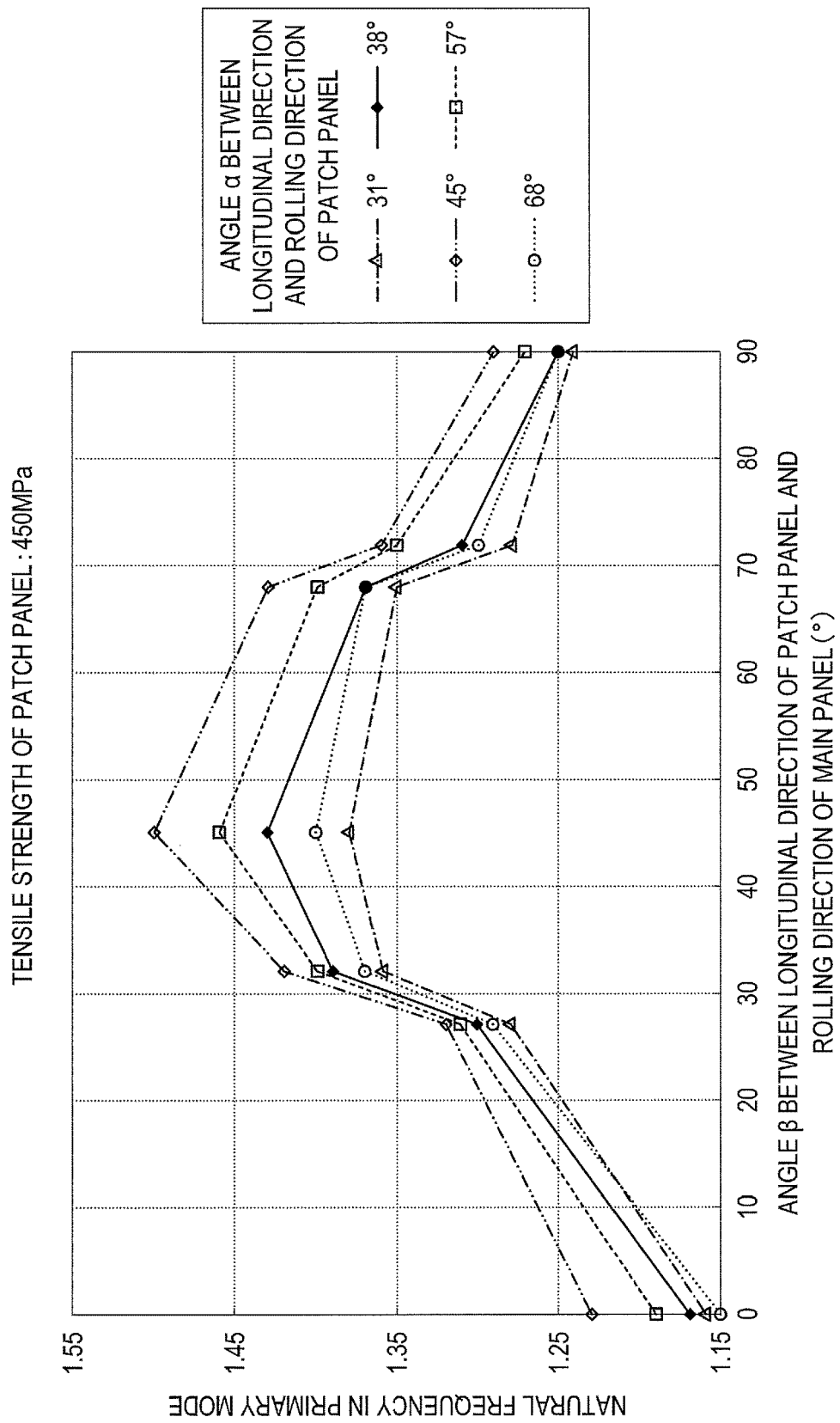
FIG. 9 is a graph showing a result of simulation in a case of using a steel plate having a tensile strength of 450 MPa as a patch panel.
Figure 10:
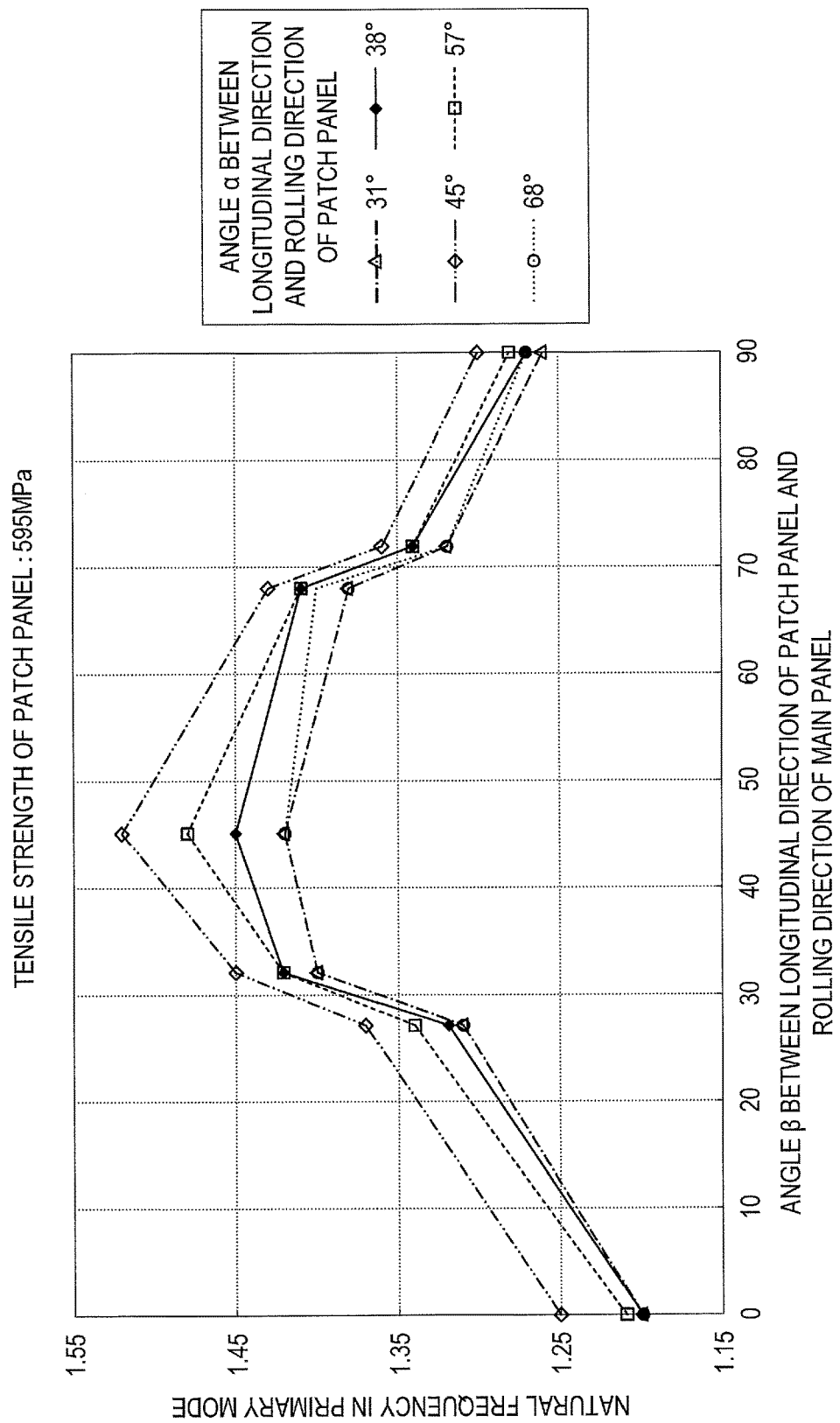
FIG. 10 is a graph showing a result of simulation in a case of using a steel plate having a tensile strength of 595 MPa as a patch panel.
Figure 11:
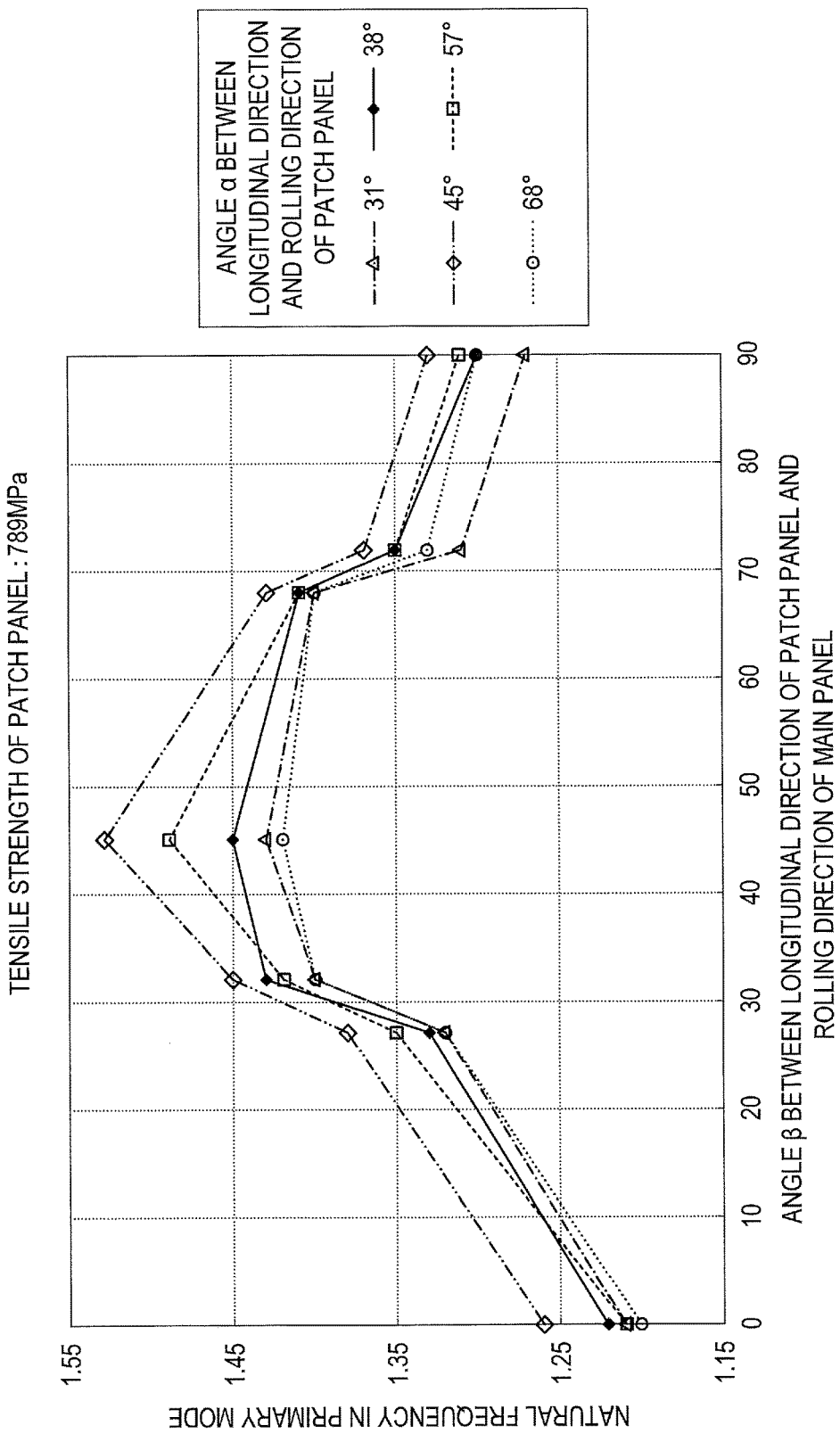
FIG. 11 is a graph showing a result of simulation in a case of using a steel plate having a tensile strength of 789 MPa as a patch panel.

Next, a preferable value of the angle β which is determined according to the above results of the simulation is described. FIG. 9 is a graph which was formed based on the data shown in Tables 1 to 3 and shows a relationship between the angle β and the natural frequency in the primary mode (dimensionless value) in the evaluation models using the steel plate with a tensile strength of 450 MPa as the patch panel 12. FIG. 10 is a graph which was formed based on the data shown in Tables 4 to 6 and shows a relationship between the angle β and the natural frequency in the primary mode (dimensionless value) in the evaluation models using the steel plate with a tensile strength of 595 MPa as the patch panel 12. FIG. 11 is a graph which was formed based on the data shown in Tables 7 to 9 and shows a relationship between the angle β and the natural frequency in the primary mode (dimensionless value) in the evaluation models using the steel plate with a tensile strength of 789 MPa as the patch panel 12. It should be noted that FIGS. 9 to 11 show the data of the evaluation models, in which the angle α was set at a value (31 degrees, 38 degrees, 45 degrees, 57 degrees, or 68 degrees) within the range of the present invention.

As shown in FIG. 9, in the evaluation models using the steel plate with a tensile strength of 450 MPa as the patch panel 12, the natural frequency in the primary mode was low in the range, in which the angle β was 27 degrees or less or 72 degrees or more, regardless of the value of the angle α. Similarly, as shown in FIGS. 10 and 11, in the evaluation models using the steel plate with a tensile strength of 595 MPa or 789 MPa as the patch panel 12, the natural frequency in the primary mode was low in the range, in which the angle β was 27 degrees or less or 72 degrees or more, regardless of the value of the angle α. Moreover, as shown in FIGS. 9 to 11, the natural frequency in the primary mode of each of the evaluation models was significantly increased in the range, in which the angle β was 32 to 68 degrees, regardless of the value of the angle α. According to these results, the inventors of the present invention specified a preferable range of the angle β of the panel member 10 according to the present invention at 30 to 70 degrees and also specified a more preferable range of the angle β at 32 to 68 degrees. By thus specifying the angle β, the natural frequency in the primary mode of the panel member 10 is made further high. That is, the vibration characteristic of the panel member 10 is further improved.

The natural frequency in the primary mode of the evaluation model was low in the range, in which the angle β between the longitudinal direction LD of the patch panel 12 and the rolling direction RD2 of the main body 16 was 27 degrees or less or 72 degrees or more. The reason for this can be considered as follows. That is, when the angle β is 27 degrees or less or 72 degrees or more, the difference of the Young's modulus of the main body 16 is great between a direction parallel to the longitudinal direction LD (hereinafter simply called a longitudinal direction LD) and a direction parallel to the width direction WD (hereinafter simply called a width direction WD). This is clearly shown in FIG. 3. For example, in the main body 16 which has Young's modulus in the longitudinal direction LD that is lower than the Young's modulus in the width direction WD, when a natural frequency in a primary mode is generated in an area that is affixed with the patch panel 12, the amount of elastic deformation (elongation amount) of the main body 16 with respect to the stress in the longitudinal direction LD is increased. Moreover, in the main body 16, the effect of the stress (elongation) that is generated in the longitudinal direction LD on the shrinkage in the width direction WD is increased, whereby the amount of shrinkage of the main body 16 in the width direction WD is increased. Thus, the stress in the main body 16 in the width direction WD is increased, whereby the difference of the stress between the longitudinal direction LD and the width direction WD is increased. Therefore, a difference is generated in the bending moment of the main body 16 between the longitudinal direction LD and the width direction WD, thereby facilitating antiplane deformation of the panel member 10. As a result, the natural frequency in the primary mode of the panel member 10 is decreased.

In other words, the likelihood of the vibration of the primary mode of the main body 16 depends on the Young's modulus in the longitudinal direction LD and in the width direction WD, but when the difference of the Young's modulus between the longitudinal direction LD and the width direction WD is great, the likelihood of the vibration of the main body 16 differs between the longitudinal direction LD and the width direction WD, whereby a stress component which facilitates the deformation toward the outside is generated in the main body 16. Then, the natural frequency is decreased by the stress component compared with the case, in which the Young's modulus is the same in both of the longitudinal direction LD and the width direction WD.

Figure 12A:
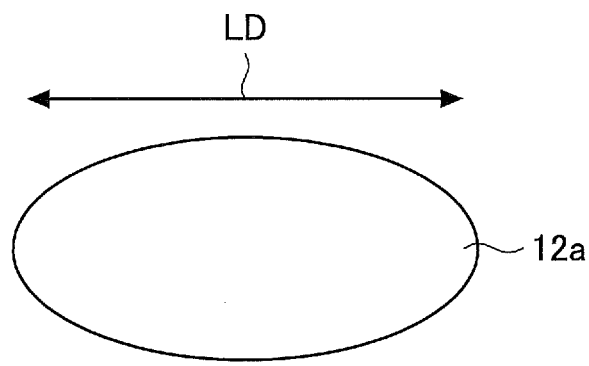
FIG. 12A shows another example of a patch panel.

Although the case in which the panel member 10 includes the patch panel 12 having a rectangular shape is described in the above embodiment, the shape of the patch panel 12 is not limited to the example described above. For example, as shown in FIG. 12A, the panel member may include a patch panel 12a which has an elliptic shape. Here, in the patch panel 12a, the longitudinal axis direction (long diameter direction) is defined as the longitudinal direction LD.

Figure 12B:
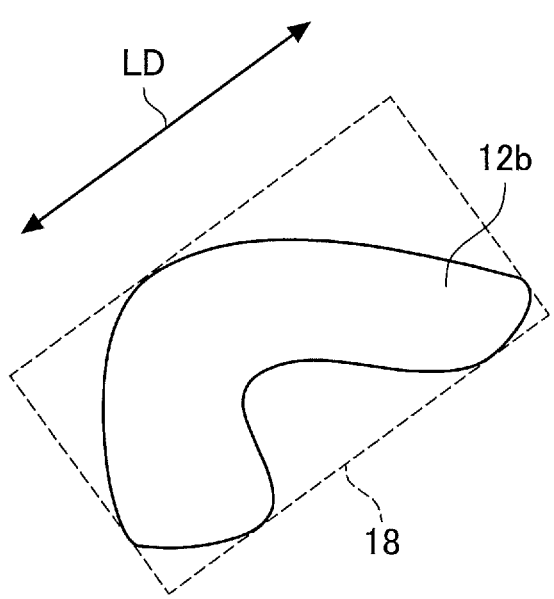
FIG. 12B shows another example of a patch panel.

For another example, as shown in FIG. 12B, the panel member may include a patch panel 12b which has a bent shape. Here, in such a patch panel 12b, for example, a long side direction of a rectangle 18 which has the smallest area among virtual rectangles that circumscribe the patch panel 12b is defined as the longitudinal direction LD.

Although the patch panel 12 is affixed on the main body 16 with the adhesive in the above embodiment, the patch panel 12 and the main body 16 may be further strongly bonded together by spot welding after the patch panel 12 and the main body 16 are affixed to each other with the adhesive.

Figure 13:
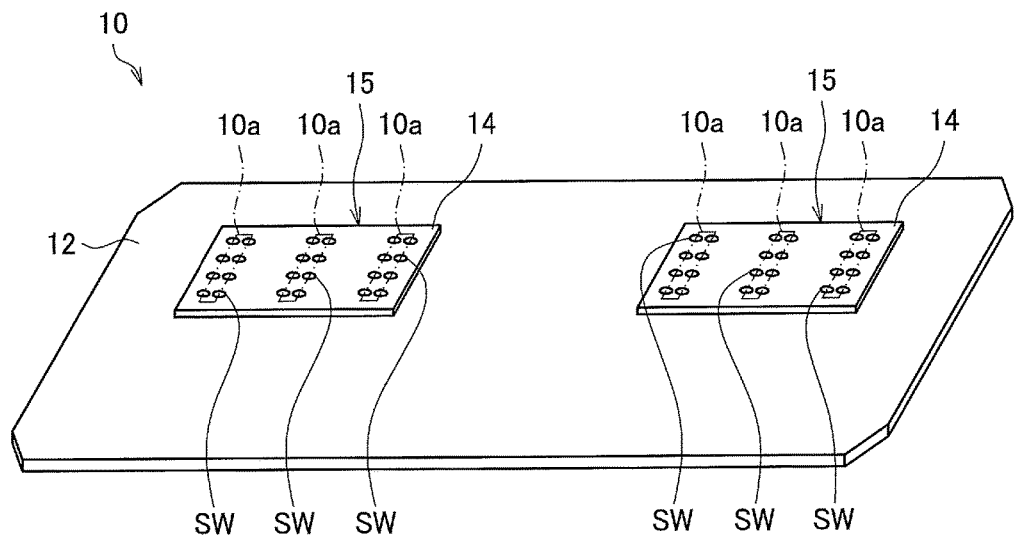
FIG. 13 is an external perspective view of a panel member according to an embodiment of the present invention.
Figure 14:
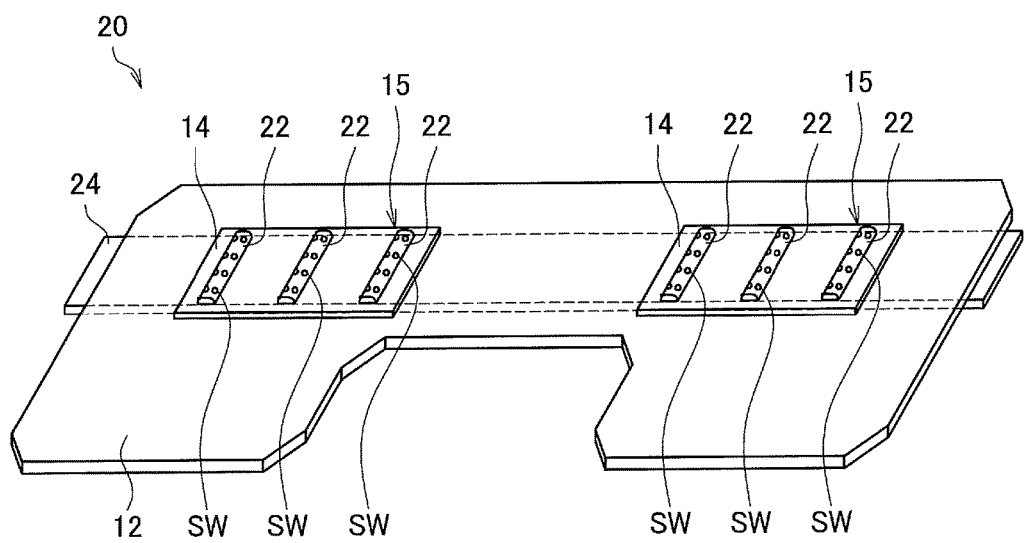
FIG. 14 is an external perspective view of a dash panel according to an embodiment of the present invention.

As described above, in the embodiment, by optimizing the angle α between the longitudinal direction LD and the rolling direction RD1 of the patch panel 12, the vibration characteristic of the panel member 10 is improved. Moreover, by optimizing the angle β between the longitudinal direction LD of the patch panel 12 and the rolling direction RD2 of the main panel 16 the main body 16, the vibration characteristic of the panel member 10 is improved. Hereinafter, variations of the structure of the panel member 10 and the vibration attenuating function of the patch member 13 are described. FIG. 13 is an external perspective view showing a variation of the panel member 10 according to an embodiment of the present invention, and FIG. 14 is an external perspective view showing a dash panel 20 which is produced by using the panel member 10 shown in FIG. 13.

As shown in FIG. 13, the panel member 10 includes a plate-like main body (base plate) 12 and a pair of patch members 13 which is affixed on the main body 16. In this embodiment, in a plan view, the patch members 13 are smaller in size than the main body 16. Each of the patch members 13 is formed of a patch panel 12 and a vibration attenuating resin layer 14 (refer to FIG. 16) which is provided along a surface of the patch panel 12, and the patch panel 12 is affixed on the main body 16 via the vibration attenuating resin layer 14. The panel member 10 has multiple working scheduled portions 10a which extend mutually in parallel. The working scheduled portions 10a are portions which are to be deformed when a transportation vehicle part (in this embodiment, a dash panel 20) is produced by using the panel member 10.

In this embodiment, for example, when the dash panel 20 is produced by using the panel member 10 in an automobile manufacturing plant, bead working (rigidity reinforcing working) is performed on the multiple working scheduled portions 10a, and multiple worked portions are formed. In this embodiment, as shown in FIG. 14, multiple bead portions 22 are formed as the worked portions. Each of the bead portions 22 is formed so as to extend in one direction. It should be noted that the bead working is exemplified as the rigidity reinforcing working in this embodiment, but another method such as emboss working may be performed.

The main body 16 and the patch panels 12 are made of metal materials (for example, steel plates). More specifically, for example, a thin steel plate may be used for the main body 16. The thickness of the main body 16 is, for example, 0.5 to 3.2 mm, and more preferably 0.7 to 2.3 mm. As for the patch panels 12, for example, a steel plate (such as a soft steel) which is made of the same metal material as the main body 16 may be used. Details will be described later, but since a vibration attenuating function is performed by the vibration attenuating resin layer 14, the patch panels 12 may be made of another metal material such as aluminum, a resin material, or the like. In order to increase the rigidity of the panel member 10, a metal material is suitably used for the patch panels 12. The thickness of the patch panels 12 is, for example, 0.5 to 2.0 mm, and more preferably 0.7 to 1.2 mm. The vibration attenuating resin layer 14 that is described later is made of a viscoelastic resin, and for example, an acrylic resin which also functions as an adhesive may be used.

As shown in FIG. 13, the patch panels 12 are spot-welded at the working scheduled portions 10a on the main body 16. In this embodiment, multiple potions of the patch panels 12 are bonded to the main body 16 by the spot welding. Thus, each of the working scheduled portions 10a is formed with multiple spot-welded portions SW. In order to spot welding the patch panels 12 to the main body 16, the vibration attenuating resin layer 14 has conductivity. It should be noted that the bonding of the main body 16 and the patch panels 12 may not necessarily be performed by the spot welding and may be performed by laser welding, arc welding, arc spot welding, or the like. In a case of bonding the main body 16 and the patch panels 12 by a method other than the spot welding, the vibration attenuating resin layer 14 may not necessarily have conductivity.

As shown in FIG. 14, the dash panel 20 that is produced by using the panel member 10 is provided with a cross member 24, for example. Specifically, the cross member 24 is fixed on a front surface (surface in the front side in an automobile longitudinal direction) of the dash panel 20. In this embodiment, the pair of the patch members 13 is provided at a position opposite to the position of the cross member 24 so as to hold the main body 16 between the patch members 13 and the cross member 24.

Figure 15A:
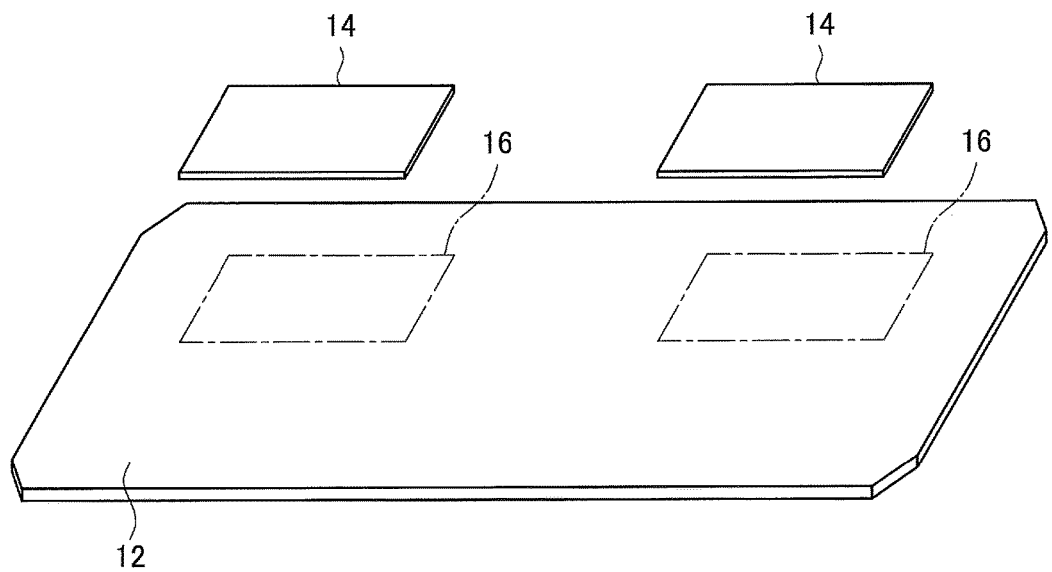
FIG. 15A illustrates an example of a method for producing a panel member.
Figure 15B:
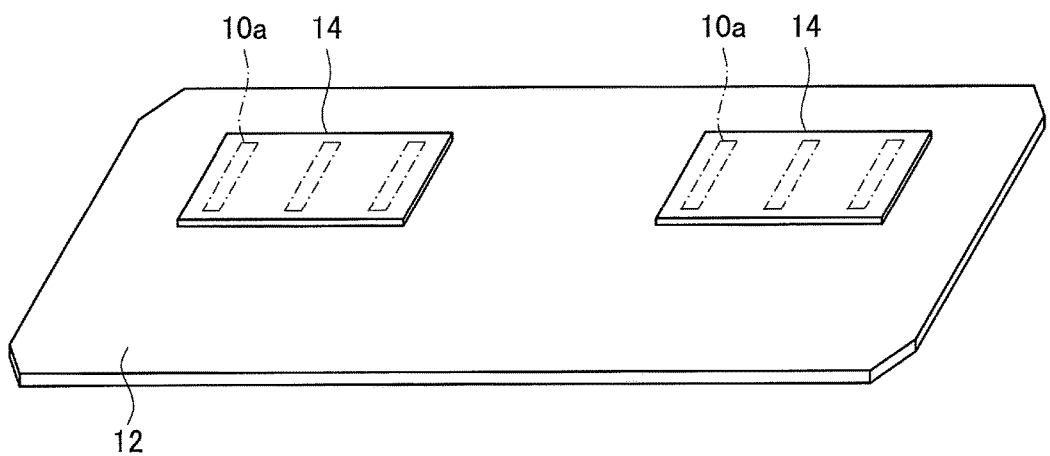
FIG. 15B illustrates an example of a method for producing a panel member.
Figure 16A:
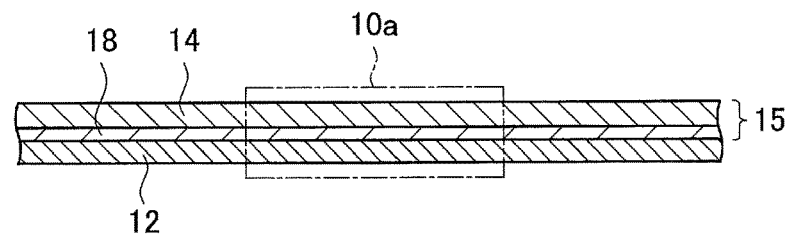
FIG. 16A illustrates an example of a method for producing a panel member and a dash panel.
Figure 16B:
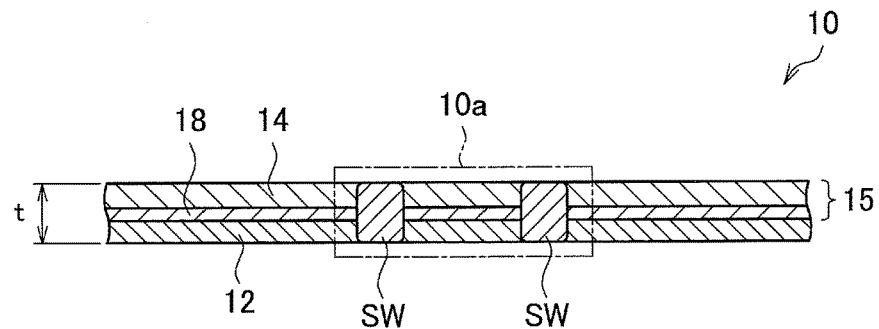
FIG. 16B illustrates an example of a method for producing a panel member and a dash panel.
Figure 16C:
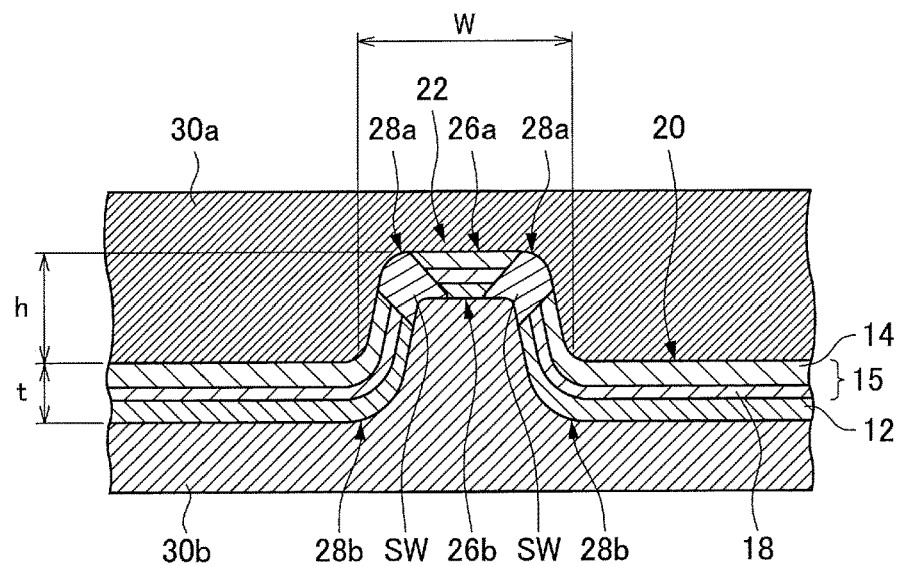
FIG. 16C illustrates an example of a method for producing a panel member and a dash panel.

FIGS. 15A, 15B, 16A, 16B, and 16C illustrate an example of a method for producing the panel member 10 and the dash panel 20. It should be noted that FIGS. 16A, 16B, and 16C are sectional views of the panel member 10 and the dash panel 20 in the vicinity of the working scheduled portion 10a.

As shown in FIG. 15A, for example, first, a main body 16 and patch panels 12 are prepared, and patch members 13 are constructed by applying a vibration attenuating resin layer 14 on each of the patch panels 12. Then, as shown in FIGS. 15B and 16A, the main body 16 and the vibration attenuating resin layer 14 are made to closely contact with each other, and the patch members 13 are affixed on the main body 16. Alternatively, as shown in FIG. 15A, an acrylic resin for the vibration attenuating resin layer 14 is applied on predetermined areas 17 of the main body 16, and then, as shown in FIGS. 15B and 16A, the patch panels 12 are affixed on the areas 16 that are applied with the acrylic resin. Thus, a vibration attenuating resin layer 14 is formed between the main body 16 and the patch panels 12.

Then, as shown in FIG. 16B, the main body 16 and the patch panel 12 are spot-welded at a working scheduled portion 10a. Specifically, as shown in FIG. 13, the main body 16 and the patch panel 12 are spot-welded so that multiple spot-welded portions SW will be formed at each of the working scheduled portions 10a. In this embodiment, the spot welding is performed at a working scheduled portion 10a so that multiple spot-welded portions SW are arranged in two rows. Thus, a panel member 10 is completed.

Next, as shown in FIG. 16C, bead working is performed on the panel member 10 by using a pair of punches 30a and 30b of a press machine. Specifically, the panel member 10 is held (pressed) by the pair of the punches 30a and 30b so that a protrusion 26a will be formed in the patch panel 12 and so that a protrusion 26b will be formed in the main body 16 at each of the working scheduled portions 10a. Thus, a bead portion 22 formed of the protrusions 26a and 26b is formed.

In this embodiment, when the bead working is performed on the panel member 10, the main body 16 is cut into a predetermined shape (shape shown in FIG. 14) by the pair of the punches 30a and 30b. As a result, the dash panel 20 having the multiple bead portions 22 is completed. Thus, by cutting the main body 16 into the predetermined shape while the multiple bead portions 22 are formed, the dash panel 20 is produced in a short time.

Here, in this embodiment, as shown in FIG. 16C, each of the bead portions 22 is formed so that the patch panel 12 side will protrude. More specifically, the bead portion 22 has an approximately trapezoidal shape, in which the patch panel 12 side is the top in a sectional view. By thus forming each of the bead portions 22, in the dash panel 20, a pair of bent portions 28a is formed on the top side of each of the bead portions 22, and a pair of bent portions 28b is formed at a base of each of the bead portions 22. In this embodiment, the above described spot welding is performed on the panel member 10 beforehand so that the multiple spot-welded portions SW are positioned at each of the bent portions 28a. It should be noted that some or all of the multiple bead portions may be formed so as to protrude in a direction opposite to the protruding direction in the examples shown in FIGS. 14 and 16C (that is, the main body 16 side).

As shown in FIGS. 16B and 16C, in the present invention, the bead portion 22 is a bent portion which has a height "h" that is 2 to 10 times greater than the plate thickness "t" of the panel member 10 and which has a width "W" that is 5 to 30 times greater than the plate thickness "t", for example. The width "W" may be measured by using each position which stands from a flat portion of the dash panel 20 by a predetermined height (for example, a position at the height of 3% of the height "h"), as each side of the bead portion.

Figure 17:
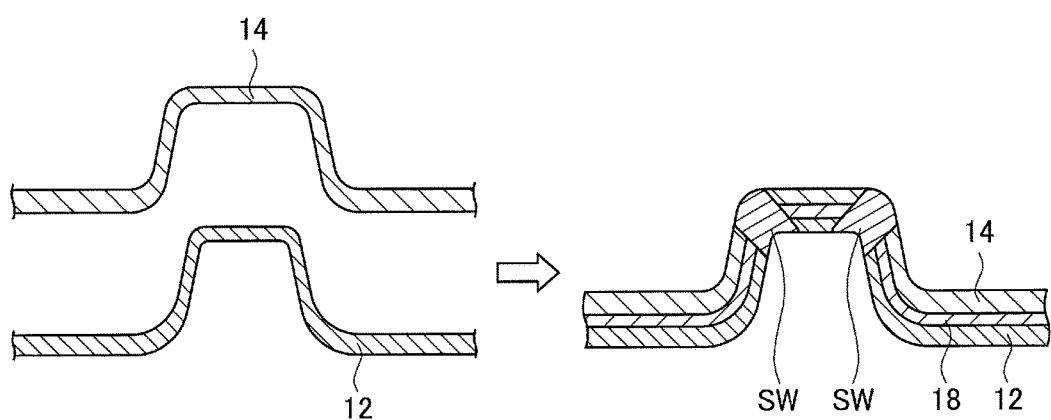
FIG. 17 is a schematic view which shows an example of bonding a main body and a patch panel with a vibration attenuating resin layer after the main body and the patch panel are respectively pressed.

In a case of making the main body 10 and the patch panels 12 of a soft steel, press working can be performed by a hot stamping method or the like as shown in FIG. 16C, in a condition in which the main body 10 and the patch panels 12 are spot-welded. On the other hand, in a case of making the main body 10 and the patch panels 12 of a relatively hard material which has a tensile strength of 590 Mpa or more (such as high tensile steel), as shown in FIG. 17, it is preferable that the main body 10 and the patch panels 12 are bonded together with the vibration attenuating resin layer 14 and are spot-welded after the main body 10 and the patch panels 12 are respectively pressed.

Since the patch members 13 that are respectively constructed of the vibration attenuating resin layer 14 and the patch panel 12 are affixed on the main body 16, the panel member 10 in this embodiment exhibits a vibration attenuating function by "shear deformation" of the vibration attenuating resin layer 14 which occurs by bending vibration.

Figure 18:
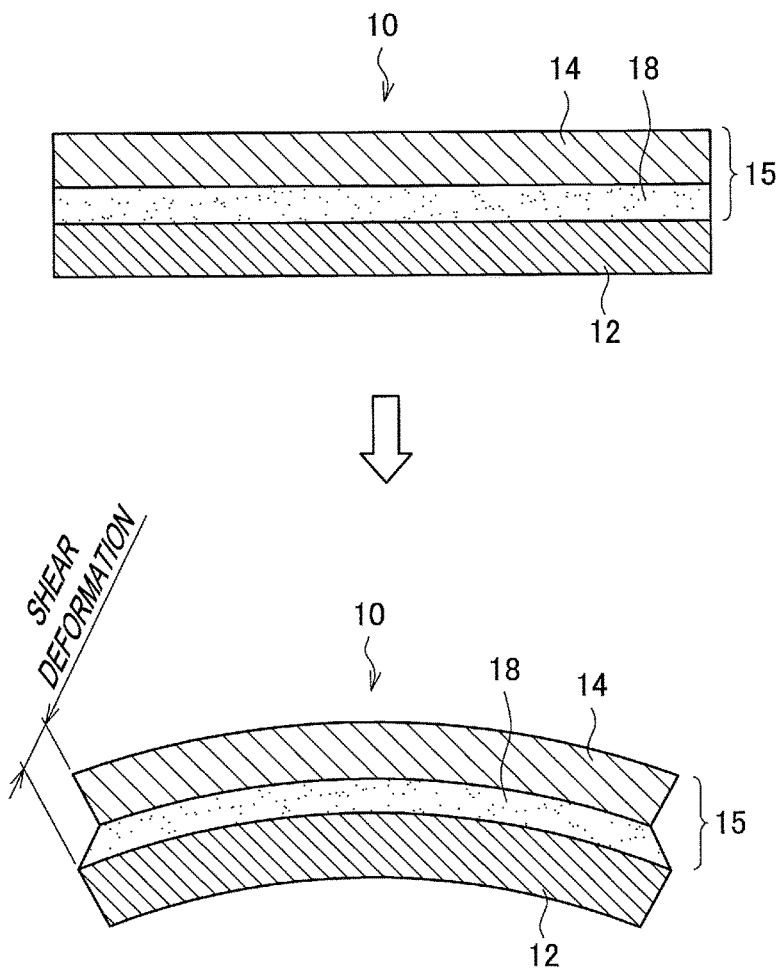
FIG. 18 is a schematic sectional view for explaining a vibration attenuating function that is performed by a vibration attenuating resin layer.

FIG. 18 is a schematic sectional view for explaining the vibration attenuating function that is performed by the vibration attenuating resin layer 14. As shown in FIG. 18, the panel member 10 can be deformed (curved) by bending vibration. At this time, in accordance with the bending vibration, the vibration attenuating resin layer 14 is stretched in the plane direction by a bonding interface between the patch panel 12 and the main body 16, whereby deformation called shear deformation occurs in the vibration attenuating resin layer 14. Then, the vibration energy is converted into thermal energy by the shear deformation of the vibration attenuating resin layer 14, whereby a vibration attenuating effect is obtained.

In the panel member 10 relating to the present invention, as described above, the main body 16 and the patch panels 12 are spot-welded beforehand at the working scheduled portions 10a. Therefore, the rigidity of the bead portions 22 is sufficiently improved in the dash panel 20 that is produced by using the panel member 10, without increasing the thickness of the patch panels 12. Accordingly, the vibration characteristic of the dash panel 20 is improved without increasing the thickness of the panel member 10.

In this embodiment, after the patch panels 12 are affixed on the main body 16, the bead portions 22 are formed. In this case, the vibration attenuating resin layer 14 that has a uniform thickness is formed at the entire area of the bead portions 22 between the main body 16 and each of the patch panels 12, and therefore, the vibration characteristic of the dash panel 20 is reliably improved.

Moreover, in this embodiment, when the main body 16 is cut into a predetermined shape, the bead portions 22 are formed. That is, the cutting of the main body 16 and the forming of the bead portions 22 are performed in a single step. Therefore, the working steps are not greatly increased, and the working cost is reduced.

The patch panel 12 may have any thickness as long as the patch panel 12 withstands the force of the vibration attenuating resin layer 14 in the plane direction when the "shear deformation" occurs in the vibration attenuating resin layer 14, which is described with reference to FIG. 18. In view of this, the patch panel 12 preferably has a plate thickness of 0.3 mm or more and not greater than the plate thickness of the main body 16.

The thickness of the vibration attenuating resin layer 14 is preferably 10 μm or more to 1000 μm or less, and more preferably 30 μm or more to 100 μm or less. Thus, the vibration of the panel member 10 is effectively attenuated.

In this embodiment, the pair of the patch members 14 is provided at a position that faces the cross member 24. The inventors of the present invention examined details of a transmission route of noise and vibration from the driving source of an automobile into the automobile (cabin). As a result, it was found that a primary transmission route of noise and vibration from the driving source into the automobile includes the bonded portion of the main body 16 and the cross member 24. In view of this, in this embodiment, the patch members 14 are provided at the positions that face the cross member 24. Thus, the transmission of noise and vibration into the automobile is more reliably suppressed.

In the embodiment described above, the case of bonding the main body 16 and the patch panels 12 at the bent portions 28a by the spot-welded portions SW is described. By thus providing the spot-welded portions SW at the bent portions 28a, even when the panel 10 is deformed and a force is applied in a direction for peeling off the patch panel 12 from the main body 16, since the main body 16 and the patch panel 12 are bonded together by the spot-welded portions SW, the patch panel 12 is not peeled off from the main body 16, and the deformation is reliably suppressed. Moreover, since the patch panel 12 is not peeled off from the main body 16, the vibration attenuating function is reliably performed by the vibration attenuating resin layer 14.

Figure 19:
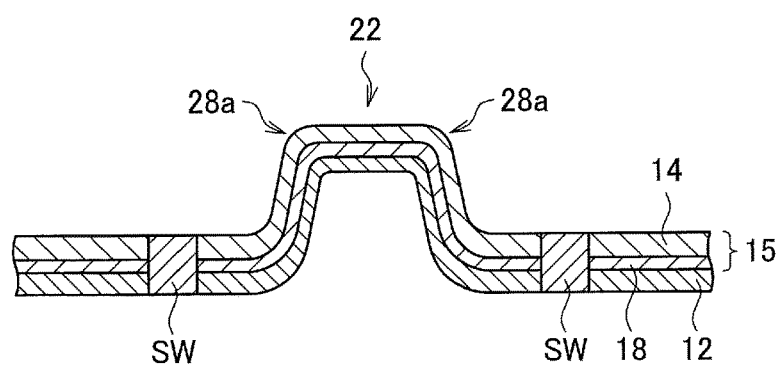
FIG. 19 is a schematic view showing an example of providing a bead portion at a portion which is not spot-welded.

In another case, the main body 16 and the patch panel 12 may be spot-welded at portions other than the bent portions 28a. For example, as shown in the sectional view in FIG. 19, the bead portion 22 may be provided at a portion which is not spot-welded. Also, in this case, the vibration attenuating function of the vibration attenuating resin layer 14 is obtained, and the effect of providing the bead portion 22 for improving the rigidity is obtained. For another example, the main body 16 and the patch panel 12 may be spot-welded at a portion (flat portion) between the pair of the bent portions 28a of the bead portion 22.

Although the panel member 10 that has the pair of the patch members 13 is described in the above embodiment, the number of the patch members 13 is not limited to the above example. For example, the panel member 10 may have one patch member 13 or may have three or more patch members 13. That is, by affixing the patch member on any portion, of which vibration characteristic needs to be improved, in the panel member 10 relating to the present invention, the vibration characteristic of the transportation vehicle part is efficiently improved.

Figure 20:
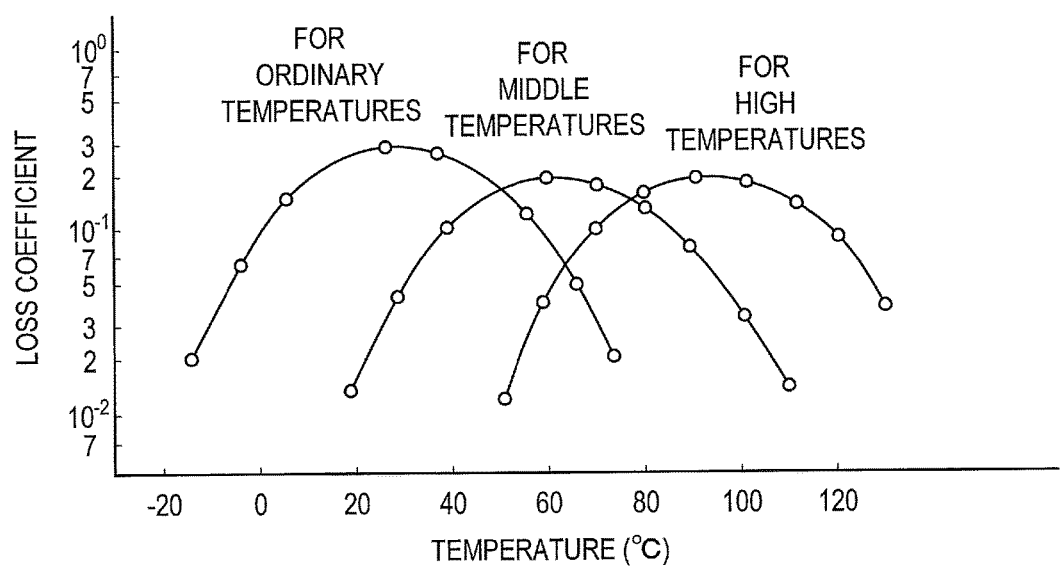
FIG. 20 is a characteristic diagram showing multiple resins which have different temperature characteristics from each other.
Figure 21:
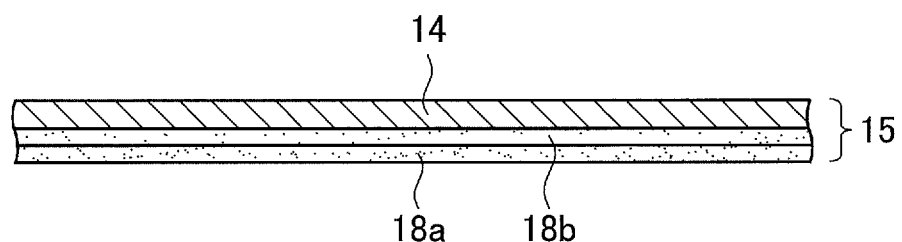
FIG. 21 is a sectional view showing an example of making a vibration attenuating resin layer of multiple resin layers.
Figure 22:
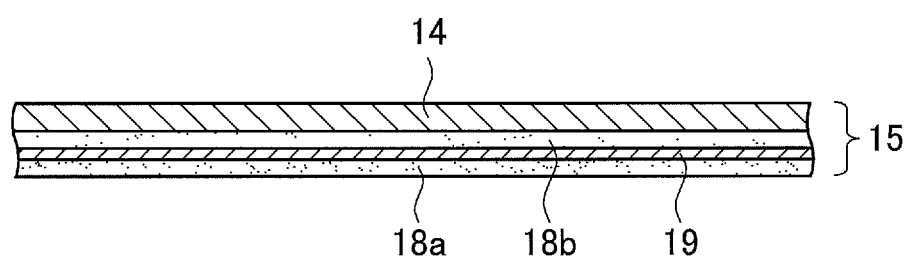
FIG. 22 is a sectional view showing an example of making a vibration attenuating resin layer of multiple resin layers.

The vibration attenuating resin layer 14 may be made of different kinds of multiple resins. In this case, the vibration attenuating resin layer 14 is made of multiple resins which have different temperature characteristics with each other. FIG. 20 is a characteristic diagram showing multiple resins which have different temperature characteristics from each other. In FIG. 8, a loss coefficient on the vertical axis is a parameter which indicates a vibration attenuating characteristic, and the vibration attenuating characteristic is higher when the value of the loss coefficient is greater. FIGS. 21 and 22 are sectional views showing examples of making a vibration attenuating resin layer 14 of multiple resin layers 18a and 18b. Here, the resin layer 18a exhibits a vibration attenuating function at high temperatures (corresponds to a material for high temperatures shown in FIG. 20), and the resin layer 18b exhibits a vibration attenuating function at ordinary temperatures (corresponds to a material for ordinary temperatures shown in FIG. 20). FIG. 21 shows an example of laminating the resin layer 18b immediately on the resin layer 18a, and FIG. 22 shows an example of inserting a panel 19 between the resin layer 18a and the resin layer 18b. Thus, in the panel member 10, the vibration attenuating function is performed in multiple conditions of different temperatures.

Figure 23:
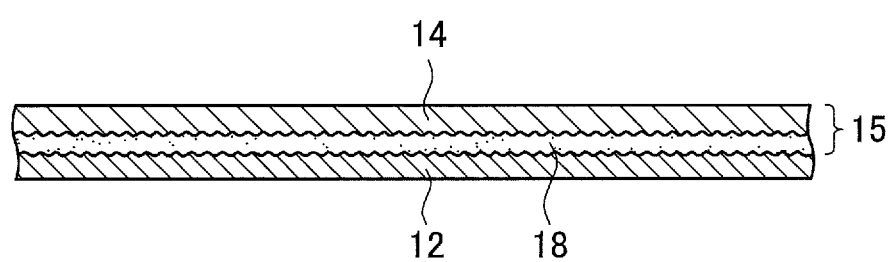
FIG. 23 is a sectional view showing an example of performing a fine uneven surface processing on a surface of a main body or a surface of a patch panel, which contact a vibration attenuating resin layer.

FIG. 23 is a sectional view showing an example of performing a fine uneven surface processing (such as satin finish processing) on a surface of the main body 16 or a surface of the patch panel 12, which contact the vibration attenuating resin layer 14. The surface processing is performed by a method such as sand blast, etching, etc. Thus, an anchoring effect is obtained by the surface processing, and the adhesion of the main body 16 or the patch panel 12 with respect to the vibration attenuating resin layer 14 is increased, whereby the vibration attenuating function is reliably performed by the "shear deformation" described above.

Figure 24:
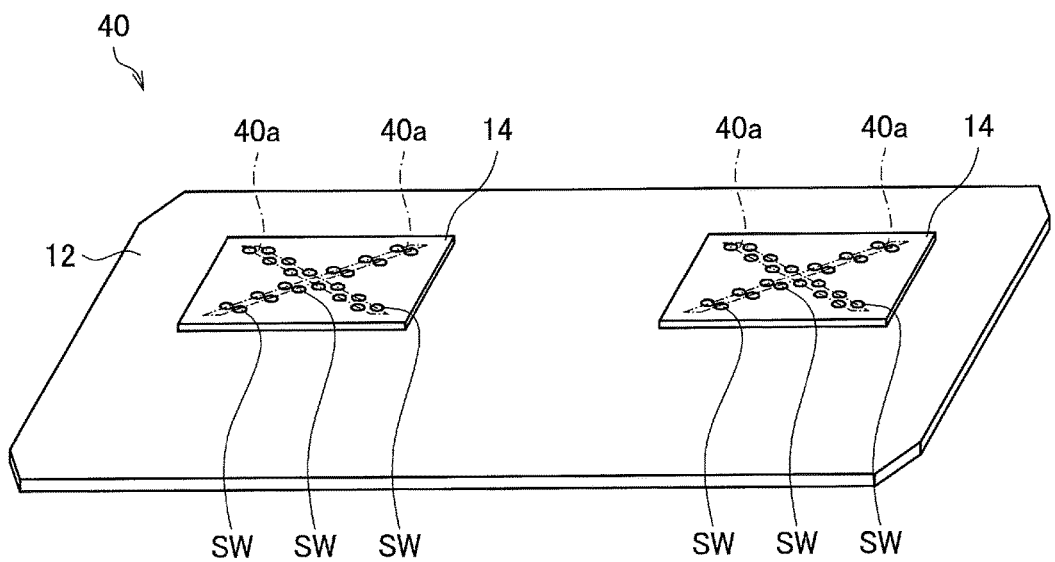
FIG. 24 is an external perspective view of a panel member according to another embodiment of the present invention.

Although the case of arranging the multiple working scheduled portions 10a so as to extend mutually in parallel is described in the above embodiment, the arrangement of the working scheduled portions is not limited to the example descried above. For example, as in the panel member 40 shown in FIG. 24, a pair of working scheduled portions 40a may be arranged so as to cross each other in each of the patch members 13. In this case, spot-welded portions SW are formed along each of the working scheduled portions 40a.

Although the dash panel 20 is described as an example of the transportation vehicle part in the above embodiment, the panel member of the present invention can be formed into another transportation vehicle part.

Figure 25:
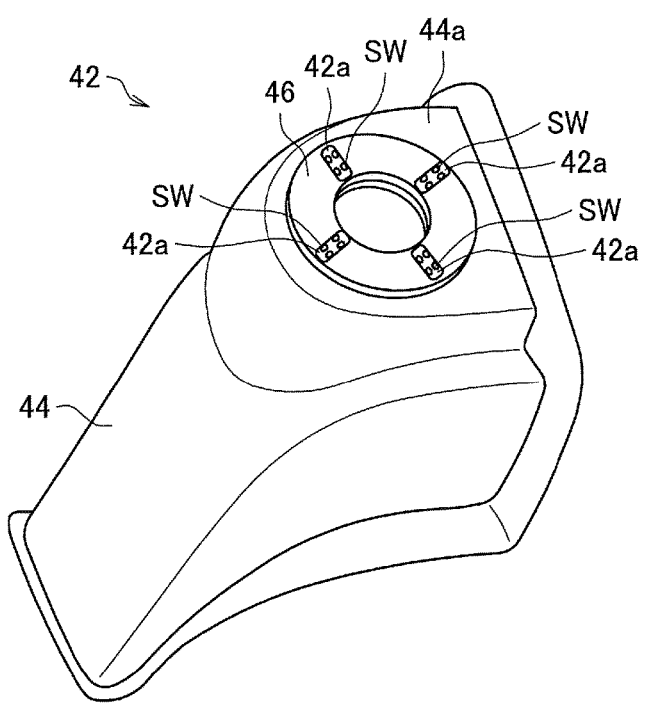
FIG. 25 is an external perspective view of a shock absorber tower.

For example, as shown in FIG. 25, a shock absorber tower 42 may be produced by using the panel member relating to the present invention. The shock absorber tower 42 includes a main body 44, which contains a shock absorber that is not shown in the figure, and a hollow disk-shaped patch panel 46, which is affixed on the main body 44 via the vibration attenuating resin layer 14 that is not shown in the figure. Here, a patch member 45 is constructed of the patch panel 46 and the vibration attenuating resin layer 14. The patch member 45 is affixed on a top portion 44a (portion that supports a shock absorber that is not shown in the figure) of the main body 44. The main body 44 and the patch panel 46 are respectively made of materials similar to the main body 16 and the patch panel 12 described above. In the shock absorber tower 42, the top portion 44a and the patch member 45 are formed with multiple bead portions 42a which extend radially. The bead portions 42a have the structure similar to the bead portion 22. Specifically, the bead portions 42a are formed by performing the bead working on the top portion 44a and the patch member 45 as in the case of the bead portion 22 described above. The main body 44 (top portion 44a) and the patch panel 46 are bonded together by multiple spot-welded portions SW which are formed at the bead portions 42a. The multiple spot-welded portions SW are formed before the panel member is formed into the shock absorber tower 42, that is, formed in the panel member beforehand.

Here, the inventors of the present invention examined details of a transmission route of noise and vibration from the driving source of an automobile into the automobile. As a result, a primary transmission route of noise and vibration from the driving source into the automobile includes a shock absorber tower. Moreover, according to the result of the examination that was conducted by the inventors of the present invention, vibration is greater at the top portion of the shock absorber tower. Therefore, the inventors of the present invention arranged the patch member 45 on the top portion 44a of the shock absorber tower 42. Thus, the rigidity of the top portion 44a is improved, whereby noise and vibration are efficiently suppressed in the shock absorber tower 42.

Figure 26A:
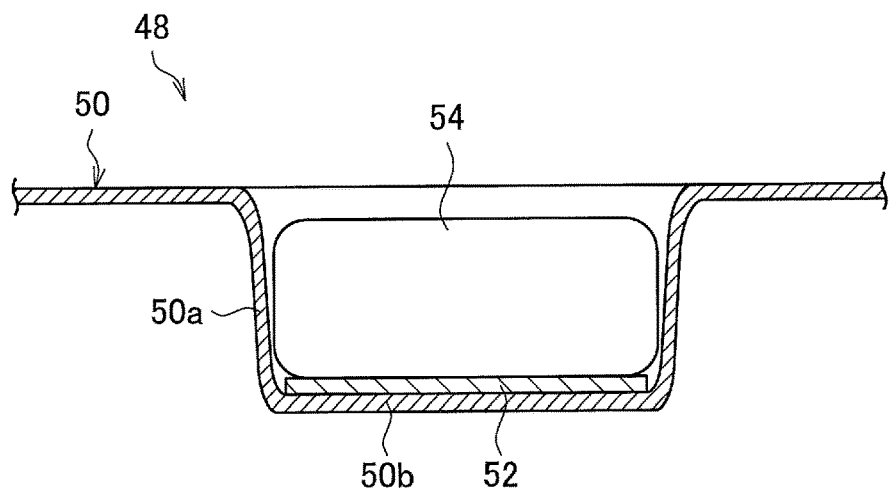
FIG. 26A is a sectional view of a trunk floor panel that is viewed from a side.
Figure 26B:
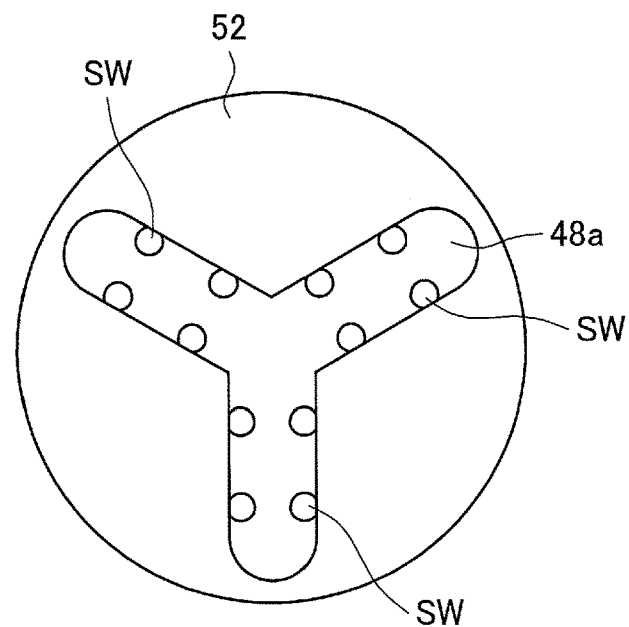
FIG. 26B is a plan view of a patch member.

For another example, as shown in FIGS. 26A and 26B, a trunk floor panel 48 may be produced by using the panel member relating to the present invention. FIG. 26A is a sectional view of the trunk floor panel 48 that is viewed from a side, and FIG. 26B is a plan view of a patch member 52. In the example shown in FIGS. 26A and 26B, the patch member 52 is constructed of a patch panel and a vibration attenuating resin layer, and the patch panel is affixed on a main body 50 via the vibration attenuating resin layer, as in the case of the above embodiment. As shown in FIG. 26A, the trunk floor panel 48 includes the main body 50, which constitutes a floor portion of a trunk, and the patch member 52, which is affixed on the main body 50 via an adhesive layer that is not shown in the figures. The main body 50 has a storage portion 50a for storing a spare tire 54. The patch member 52 is affixed on a bottom 50b of the storage portion 50a.

Figure 27:
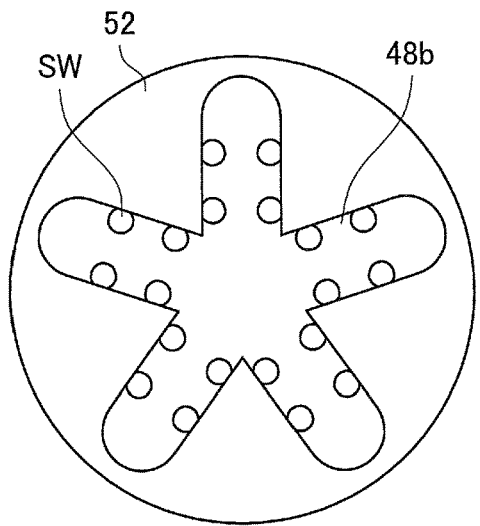
FIG. 27 is a plan view of another example of a patch member.

As shown in FIG. 26B, the patch member 52 has a disk shape. In the trunk floor panel 48, the bottom 50b and the patch member 52 are formed with a bead portion 48a. The bead portion 48a is formed so as to radially extend from the center of the bottom 50b and the patch member 52 in three directions. The bead portion 48a has the structure similar to the bead portion 22 described above. Specifically, the bead portion 48a is formed by performing the bead working on the bottom 50b and the patch member 52 as in the case of the bead portion 22 described above. The main body 50 (bottom 50b) and the patch member 52 are bonded together by multiple spot-welded portions SW which are formed in the bead portion 48a, as in the case of the main body 16 and the patch member 14 described above. The multiple spot-welded portions SW are formed before the panel member is formed into the trunk floor panel 48, that is, formed in the panel member beforehand. The bead portion is preferably formed so as to radially extend from the center of the bottom 50b and the patch member 52 in directions of three or more in odd numbers. For example, as shown in FIG. 27, the bead portion 48b may be formed so as to radially extend from the center of the main body 50 (refer to FIG. 26A) and the patch member 52 in five directions.

By providing the patch member 52 as described above, the rigidity of the bottom 50b of the storage portion 50a is improved. Thus, even when the spare tire 54 shakes within the storage portion 50a while the automobile travels, the vibration of the storage portion 50a is suppressed. As a result, transmission of noise and vibration from the trunk floor panel 48 into the automobile is suppressed.

Moreover, by forming the bead portion so as to radially extend from the center of the bottom 50b and the patch member 52 in the directions of three or more in odd numbers, vibration having the lowest frequency, that is, vibration of a primary mode which resonates first after the vibration starts, is sufficiently suppressed at the center of the bottom 50b. Thus, the transmission of noise and vibration from the trunk floor panel 48 into the automobile is reliably suppressed.

Although the case of producing the transportation vehicle part by performing the bead working on the panel member relating to the present invention is described in the above embodiment, the transportation vehicle part may be produced by performing another working on the panel member.

Figure 28:
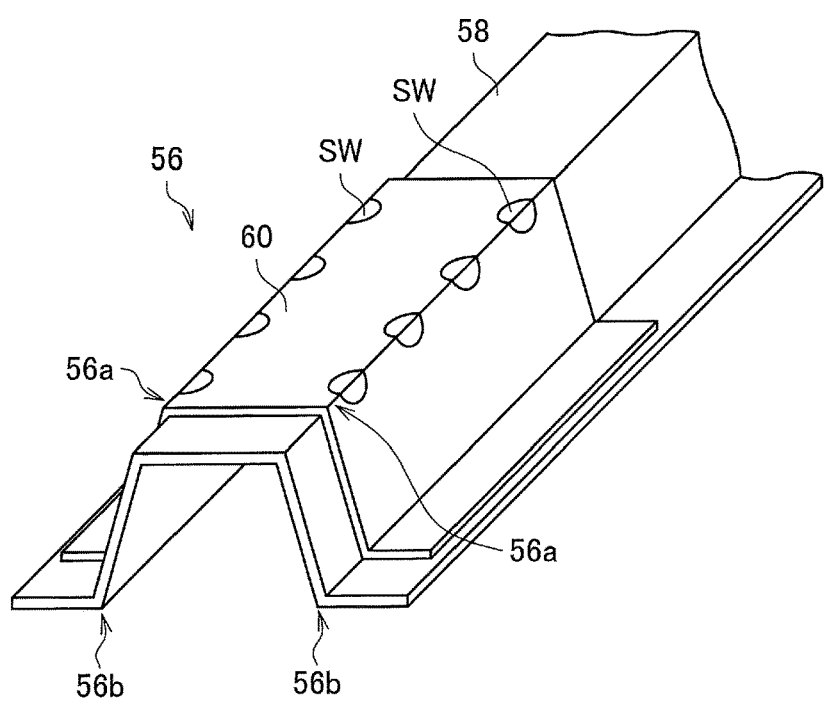
FIG. 28 is an external perspective view of a floor tunnel part.

For example, as shown in FIG. 28, a floor tunnel part 56 (member for constructing a floor of an automobile) may be produced by bending the panel member relating to the present invention by a press machine or the like. The floor tunnel part 56 includes a main body 58 and a patch member 60. Here, the patch member 60 is constructed of a patch panel and a vibration attenuating resin layer that is not shown in the figure, and the patch panel is affixed on the main body 60 via the vibration attenuating resin layer, as in the case of the above embodiment. The patch member 60 is affixed so as to cover at least a part of the main body 58 from above. The main body 58 and the patch panel of the patch member 60 are respectively made of materials similar to the main body 16 and the patch panel 12 described above.

The main body 58 and the patch member 60 are respectively formed so as to protrude upwardly. Thus, a pair of bent portions 56a is formed at a top side of the floor tunnel part 56, and a pair of bent portions 56b is formed at a base of the floor tunnel part 56. The main body 58 and the patch member 60 are bonded together at each of the bent portions 56a by multiple spot-welded portions SW. The multiple spot-welded portions SW are formed before the panel member is formed into the floor tunnel part 56, that is, formed in the panel member beforehand. More specifically, in the panel member, portions which become a pair of the bent portions 56a are spot-welded beforehand.

By providing the patch member 60 as described above, the rigidity of the floor tunnel part 56 is improved, whereby the vibration characteristic of the floor tunnel part 56 is improved. Thus, transmission of vibration and noise, which are generated from the driving source, via the floor tunnel part 56 into the automobile is suppressed.

Although details are not described by referring to figures, other automobile parts (transportation vehicle parts) such as a floor panel, wheel house inner, and the like, may be produced by using the panel member relating to the present invention.

The effects of the present invention will be described by using examples hereinafter, but the present invention is not limited to the following examples.

EXAMPLES

Figure 29:
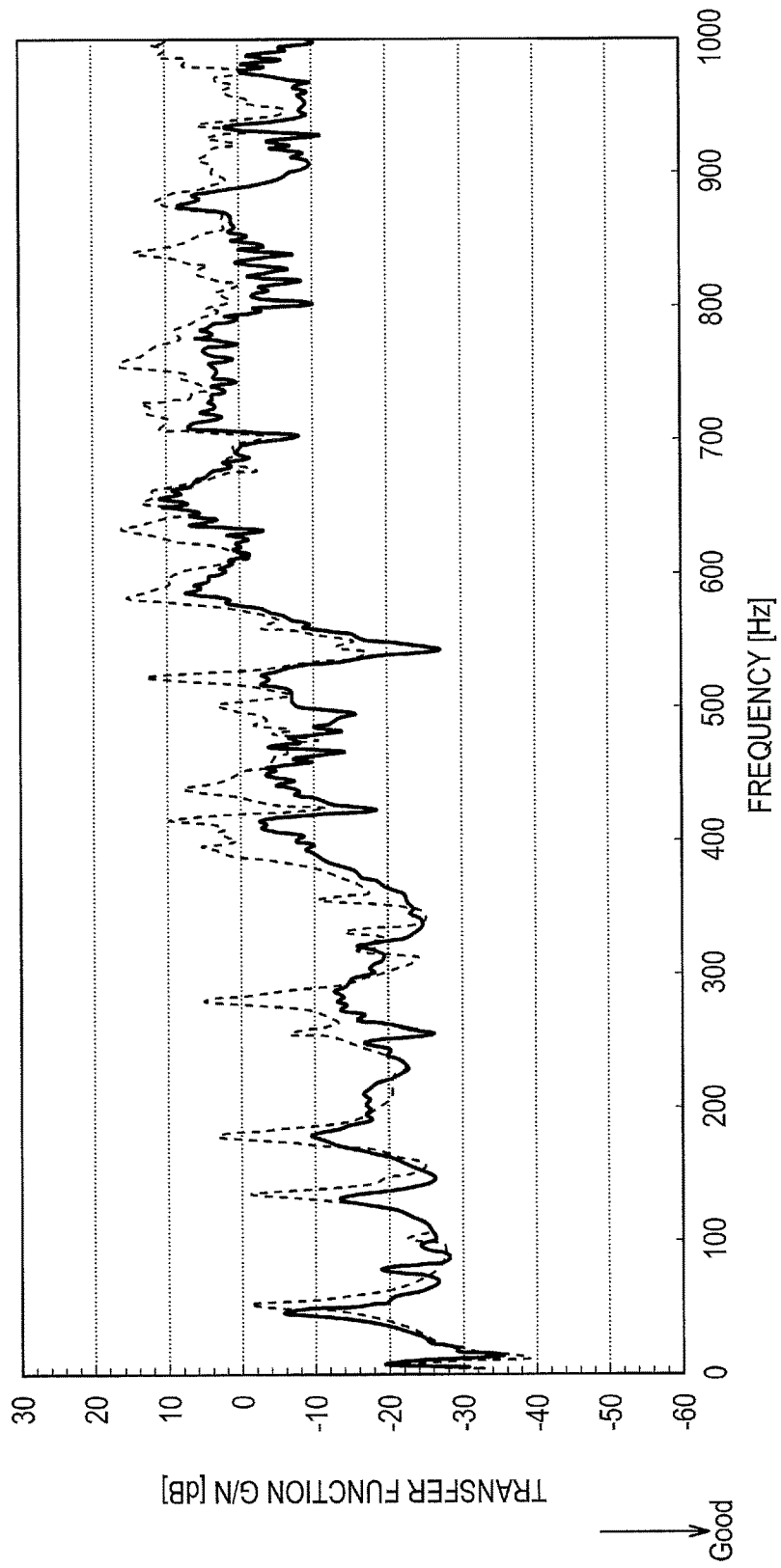
FIG. 29 is a characteristic diagram showing a transfer function of a main body which was affixed with a patch member and a transfer function of a main body which was not affixed with a patch member.
Figure 35:
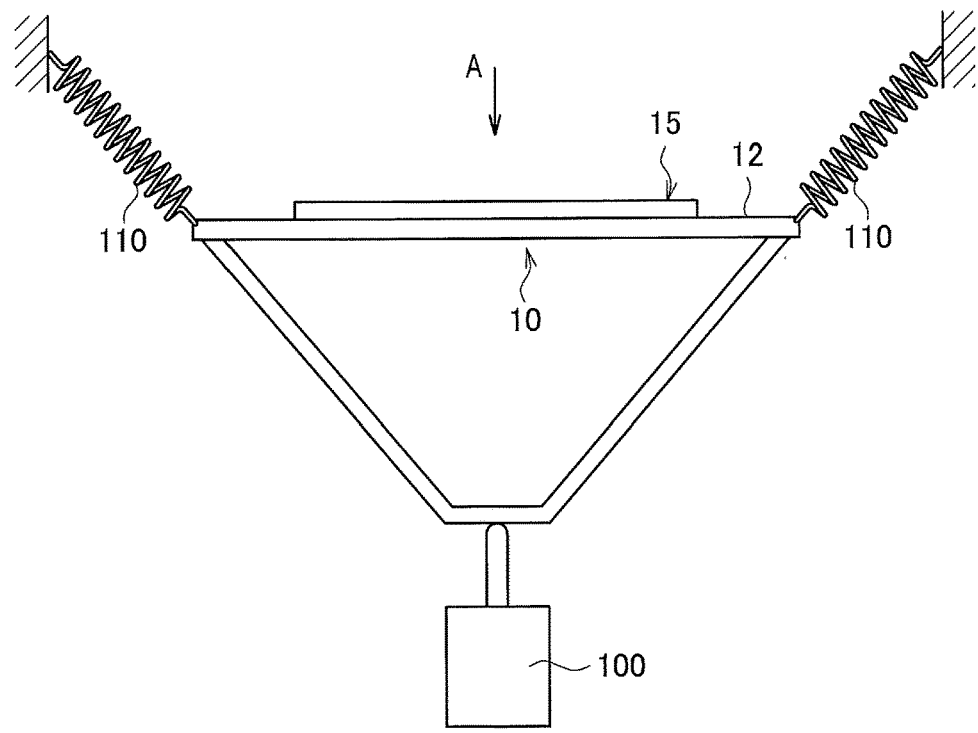
FIG. 35 is a schematic view showing a testing machine for measuring the characteristics shown in FIGS. 29 to 34.
Figure 36:
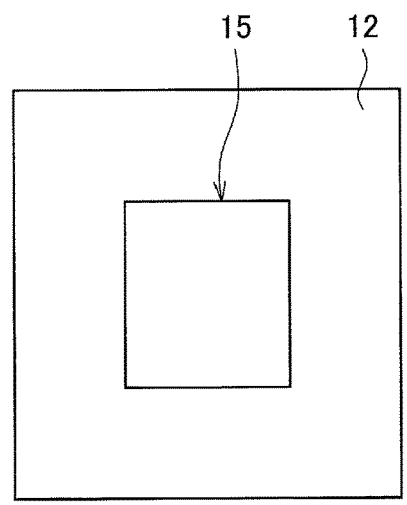
FIG. 36 is a plan view showing a condition that is viewed from the direction of an arrow "A" in FIG. 35.

FIGS. 29 to 34 are characteristic diagrams for explaining the vibration attenuating effect of the vibration attenuating resin layer 14. FIG. 29 is a characteristic diagram showing a transfer function of the main body 16 which was affixed with the patch member 13 and a transfer function of the main body 16 which was not affixed with the patch member 13. Here, the transfer function was measured by using a testing machine shown in FIG. 35. As shown in FIG. 35, the panel member 10, in which the batch member 15 was affixed on the main body 16, was held by springs 110 and was vibrated by an excitation machine 100. FIG. 36 is a plan view showing a condition which is viewed from the direction of an arrow "A" in FIG. 35. As shown in FIGS. 35 and 36, the main body 16 and the patch panel 12 were bonded together via the vibration attenuating resin layer 14, and an acceleration was measured by an accelerometer when the panel member 10 was vibrated by the excitation machine 100.

FIGS. 29 to 34 show transfer functions that were obtained from the measured accelerations. Here, the lower value of the transfer function indicates that the vibration is more effectively suppressed. As shown in FIG. 29, the value of the transfer function was greatly decreased in the characteristic (solid line) which was obtained in the case of affixing the patch member 13 on the main body 16 when compared with the characteristic (broken line) which was obtained in the case of not affixing the patch member 13 on the main body 16. Accordingly, vibration was effectively suppressed by affixing the patch member 13.

In general, noise due to vibration is generated at frequencies of 1 kHz or less. Therefore, according to the result shown in FIG. 29, vibration is effectively attenuated at frequencies of 1 kHz or less, and generation of noise is suppressed.

Figure 30:
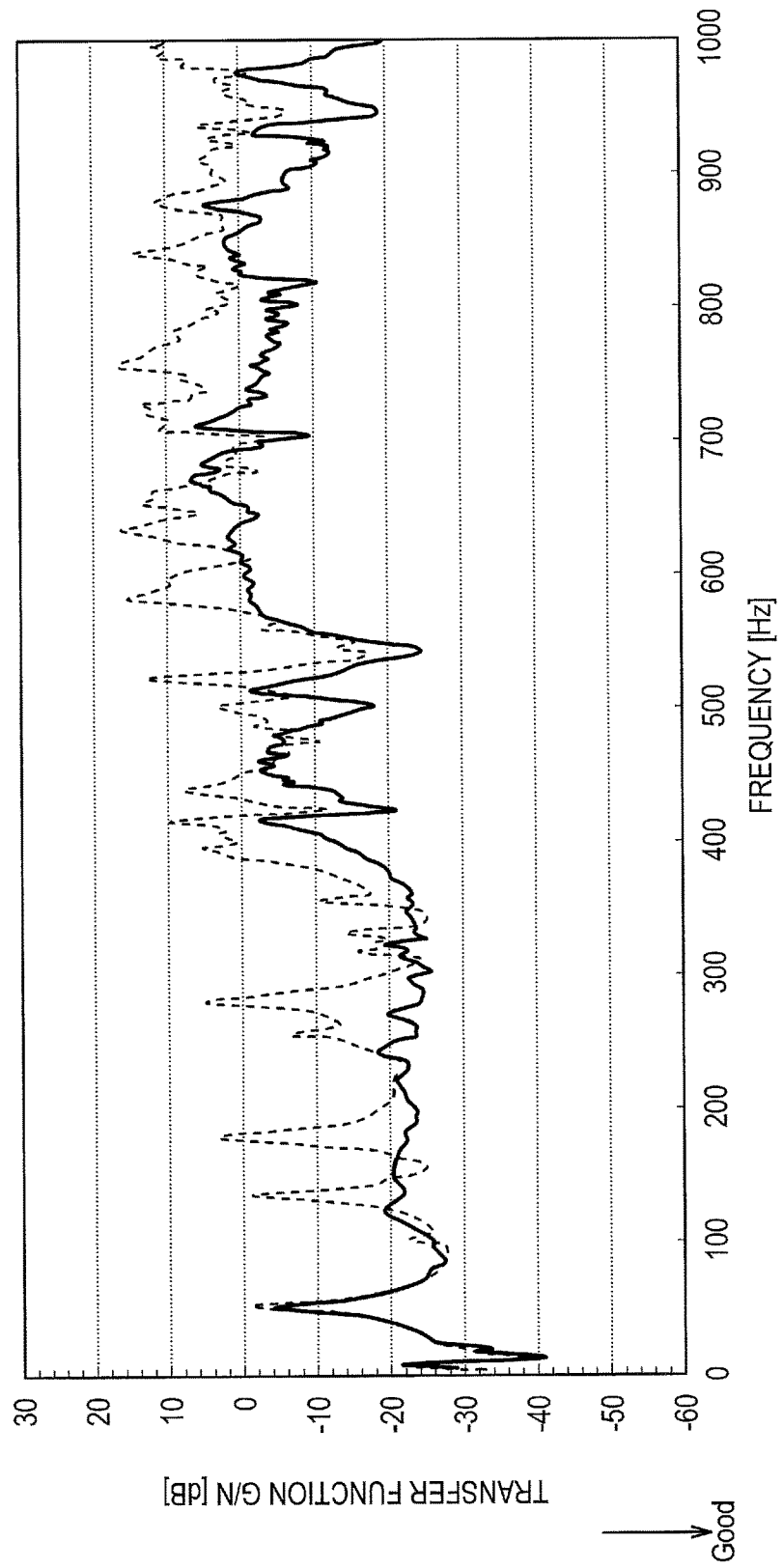
FIG. 30 is a characteristic diagram in a case in which a total plate thickness of a main body that was affixed with a patch member was made the same as the plate thickness of a main body that was not affixed with a patch member.

FIG. 30 is a characteristic diagram showing a transfer function of the main body 16 which was affixed with the patch member 13 and a transfer function of the main body 16 which was not affixed with the patch member 13, and FIG. 30 shows a case in which the total plate thickness of the main body 16 that was affixed with the patch member 13 was made the same as the plate thickness of the main body 16 that was not affixed with the patch member 13. Here, in the case of affixing the patch member 13 on the main body 16, a steel plate having a thickness of 0.6 mm, a length of 500 mm, and a width of 600 mm was used as the main body 16, and a steel plate having a thickness of 0.4 mm, a length of 400 mm, and a width of 500 mm was used as the patch panel 12. In the case of not affixing the patch member 13 on the main body 16, a steel plate having a thickness of 1.0 mm, a length of 500 mm, and a width of 600 mm was used as the main body 16. As shown in FIG. 30, the value of the transfer function was greatly decreased in the characteristic (solid line) which was obtained in the case of affixing the patch member 13 on the main body 16 when compared with the characteristic (broken line) which was obtained in the case of not affixing the patch member 13 on the main body 16. Since the total plate thickness of the main body 16 that was affixed with the patch member 13 was made the same as the plate thickness of the main body 16 that was not affixed with the patch member 13, it was found that the decrease in the value of the transfer function is greatly affected by the vibration attenuating effect that is obtained by the shear deformation of the vibration attenuating resin layer 14.

Figure 31:
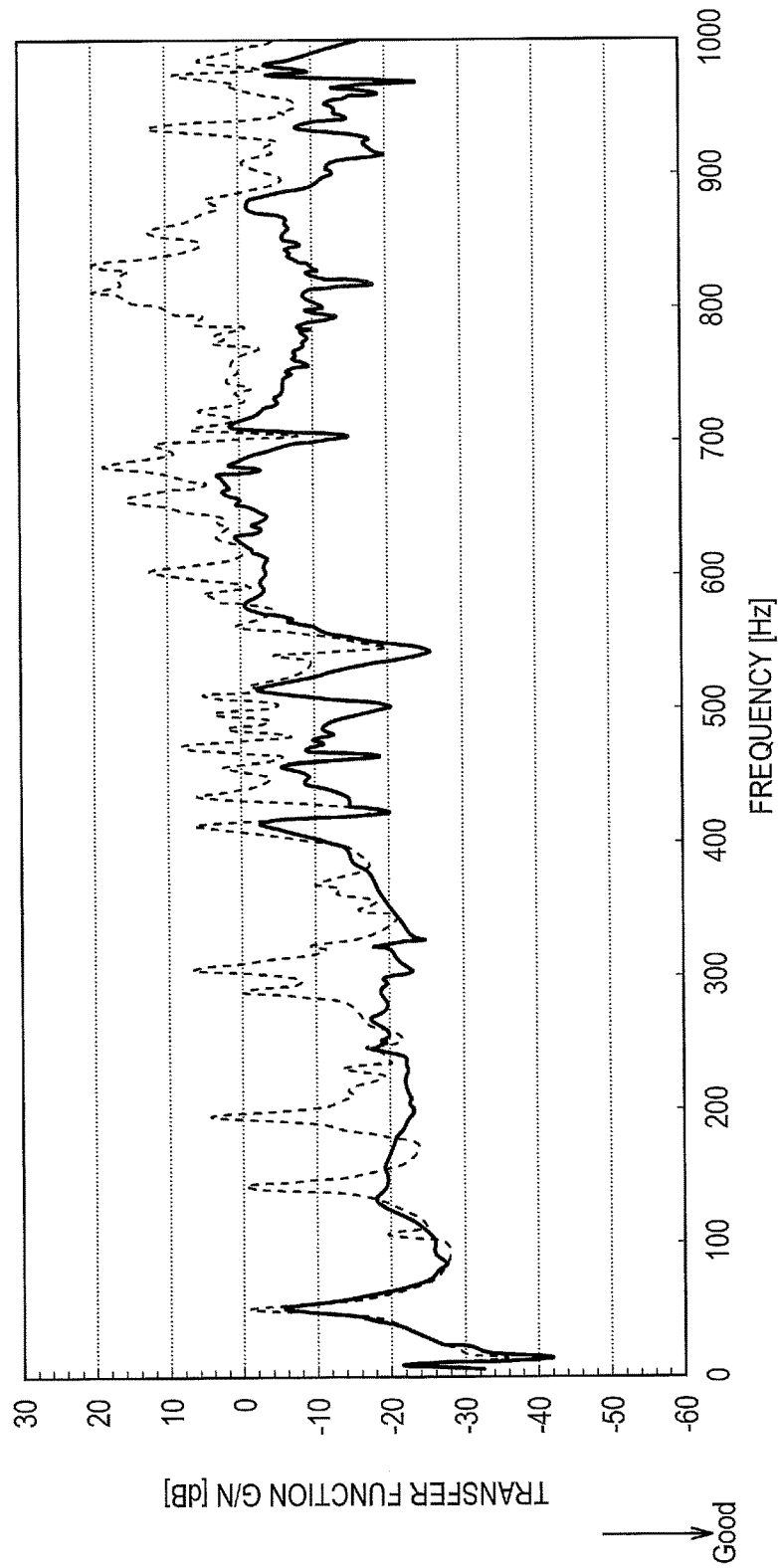
FIG. 31 shows a case in which a total plate thickness of a main body that was affixed with a patch member was made the same as the plate thickness of a main body that was not affixed with a patch member.

Similarly, FIG. 31 is a characteristic diagram showing a transfer function of the main body 16 which was affixed with the patch member 13 and a transfer function of the main body 16 which was not affixed with the patch member 13, and FIG. 31 shows a case in which the total plate thickness of the main body 16 that was affixed with the patch member 13 was made the same as the plate thickness of the main body 16 that was not affixed with the patch member 13. Here, in the case of affixing the patch member 13 on the main body 16, a steel plate having a thickness of 0.6 mm, a length of 500 mm, and a width of 600 mm was used as the main body 16, and a steel plate having a thickness of 0.6, a length of 400 mm, and a width of 500 mm was used as the patch panel 12. In the case of not affixing the patch member 13 on the main body 16, a steel plate having a thickness of 1.2 mm, a length of 500 mm, and a width of 600 mm was used as the main body 16. As shown in FIG. 31, the value of the transfer function was greatly decreased in the characteristic (solid line) which was obtained in the case of affixing the patch member 13 on the main body 16 when compared with the characteristic (broken line) which was obtained in the case of not affixing the patch member 13 on the main body 16. Since the total plate thickness of the main body 16 that was affixed with the patch member 13 was made the same as the plate thickness of the main body 16 that was not affixed with the patch member 13, it was found that the decrease in the value of the transfer function is greatly affected by the vibration attenuating effect that is obtained by the shear deformation of the vibration attenuating resin layer 14.

Figure 32:
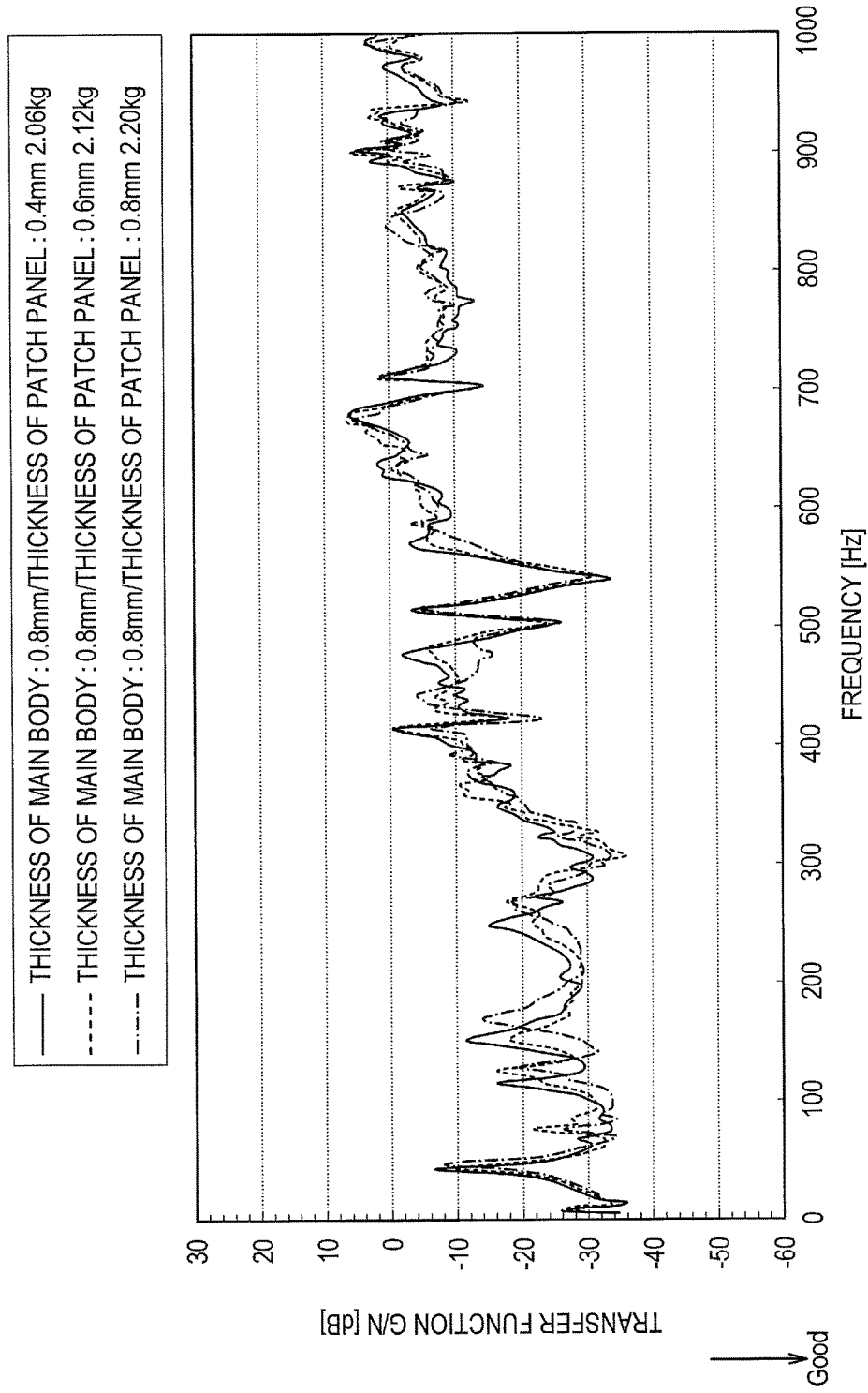
FIG. 32 is a characteristic diagram showing a transfer function of each of main bodies which had the same shape and which were respectively affixed with panel members that included patch panels having different thicknesses from each other.

FIG. 32 is a characteristic diagram showing a transfer function of each of main bodies 16 which had the same shape and which were respectively affixed with panel members 15 that included patch panels 12 having different thicknesses from each other. Here, a steel plate having a thickness of 0.8 mm, a length of 500 mm, and a width of 500 mm was used as the main body 16, and a steel plate having a thickness of 0.4 mm, a length of 250 mm, and a width of 250 mm, a steel plate having a thickness of 0.6 mm, a length of 250 mm, and a width of 250 mm, or a steel plate having a thickness of 0.8 mm, a length of 250 mm, and a width of 250 mm was used as the patch panel 12. As shown in FIG. 32, the value of the transfer function did not greatly vary even when the thickness of the patch panel 12 was changed. Accordingly, in the case of affixing the panel member 15 on the main body 16, the decrease in the value of the transfer function was greatly affected by the vibration attenuating effect that was obtained by the shear deformation of the vibration attenuating resin layer 14.

Figure 33:
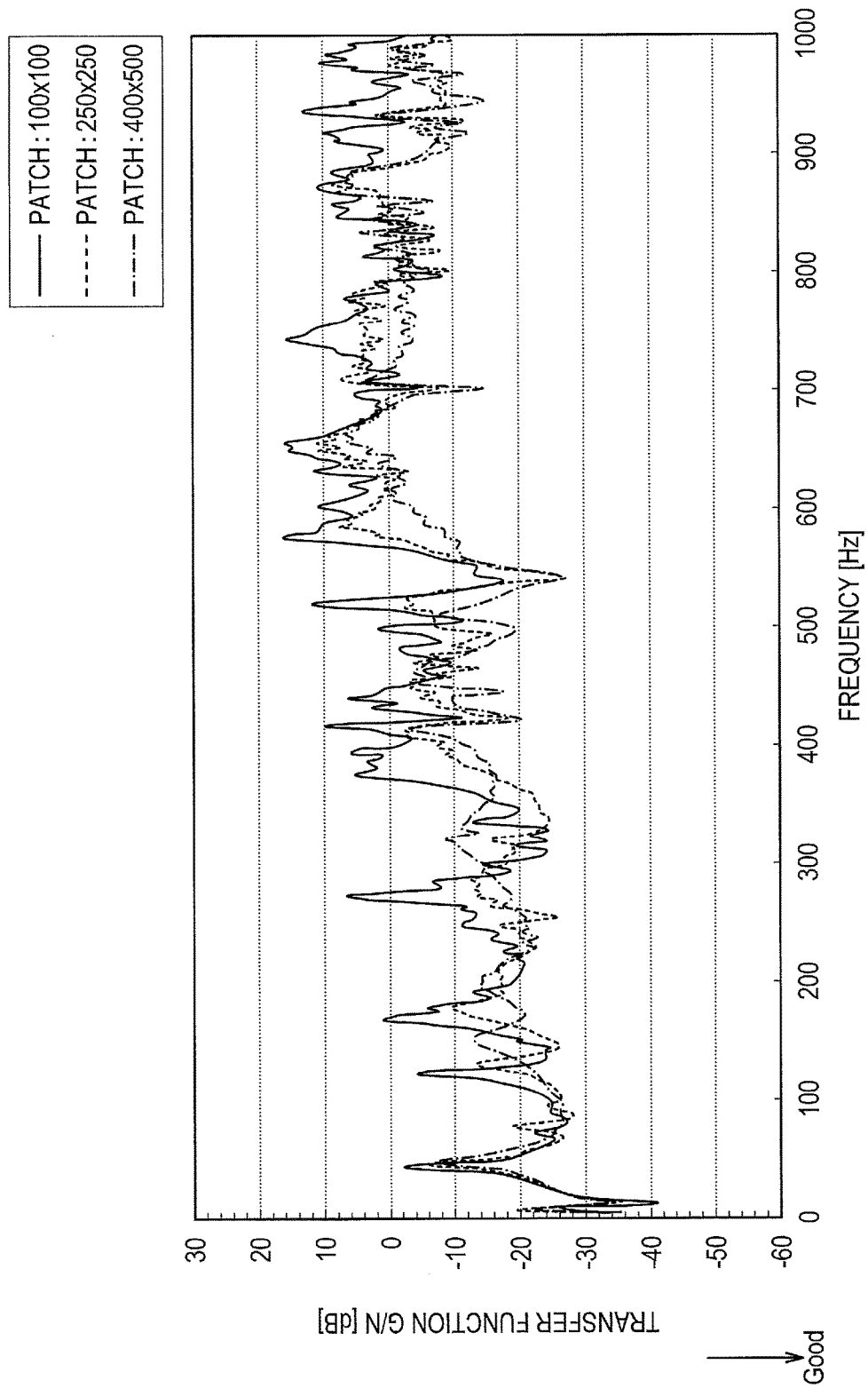
FIG. 33 is a characteristic diagram showing a case of respectively affixing patch members, which had different dimensions from each other, on main bodies.

FIG. 33 is a characteristic diagram showing a case of respectively affixing patch members, which had different dimensions from each other, on the main bodies 16. Here, a steel plate having a thickness of 1.0 mm, a length of 500 mm, and a width of 600 mm was used as the main body 16, and a steel plate having a thickness of 0.5 mm was used as the patch panel 12. As the patch panel 12, a steel plate having a length of 250 mm and a width of 250 mm, a steel plate having a length of 100 mm and a width of 100 mm, or a steel plate having a length of 400 mm and a width of 500 mm was used. As shown in FIG. 33, when the area of the patch panel 12 was greater, the vibration attenuating effect was greater.

Figure 34:
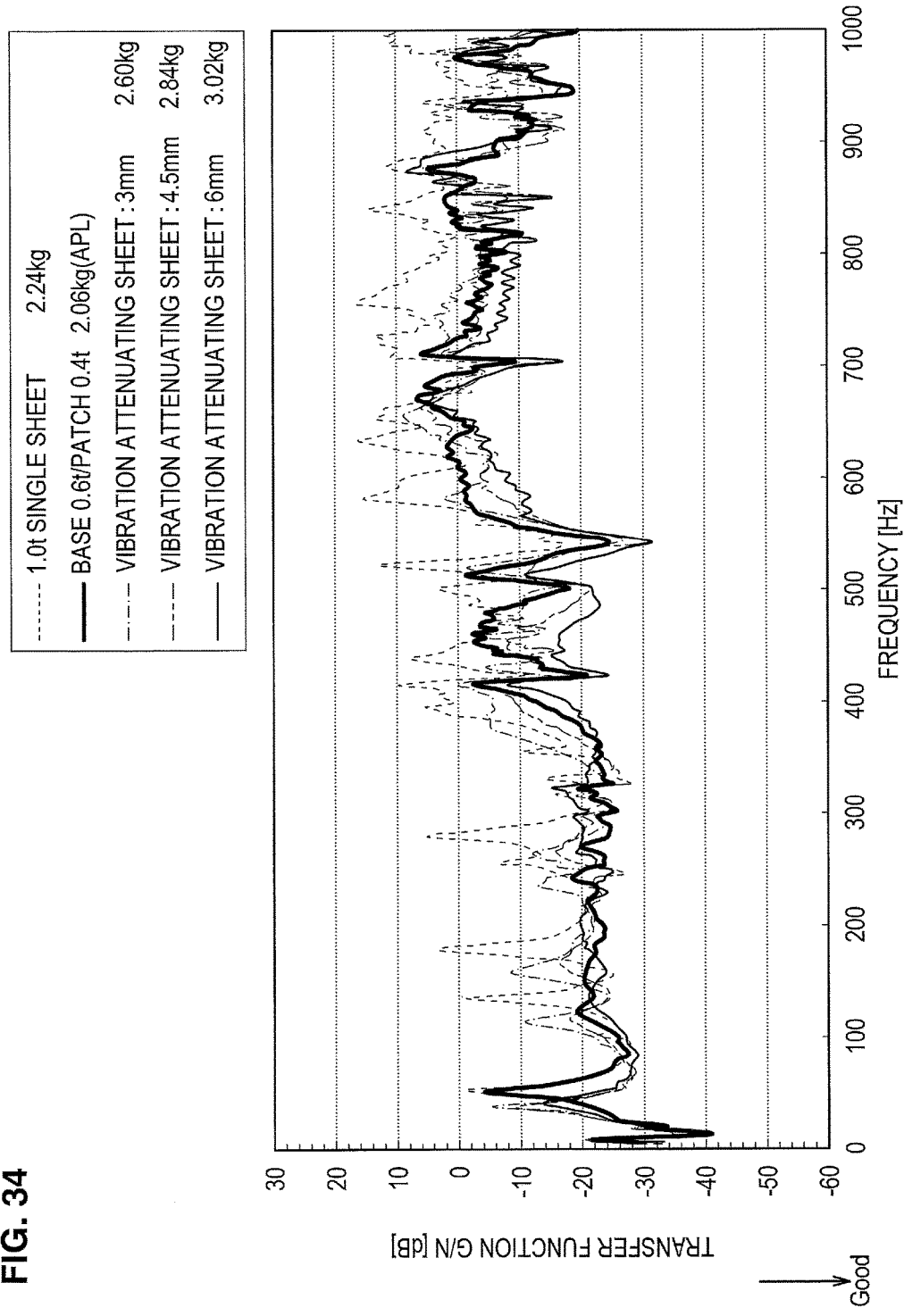
FIG. 34 is a characteristic diagram showing a case of affixing a patch member according to an embodiment on a main body in comparison with a case of affixing each of vibration attenuating sheets (thickness of 3 mm, 4.5 mm, and 6 mm).

FIG. 34 is a characteristic diagram showing a case of affixing the patch member 13 according to an embodiment on the main body 16 in comparison with a case of affixing each of vibration attenuating sheets (asphalt sheets; thickness of 3 mm, 4.5 mm, and 6 mm). Here, in the case of affixing the patch member 13 on the main body 16, a steel plate having a thickness of 0.6 mm, a length of 500 mm, and a width of 600 mm was used as the main body 16, and a steel plate having a thickness of 0.4 mm, a length of 400 mm, and a width of 500 mm was used as the patch panel 12. In the case of affixing the vibration attenuating sheet (thickness of 3 mm, 4.5 mm, or 6 mm) on the main body 16, a steel plate having a thickness of 1.0 mm, a length of 500 mm, and a width of 600 mm was used as the main body 16, and a vibration attenuating sheet (thickness of 3 mm, 4.5 mm, or 6 mm) having a length of 320 mm and a width of 510 mm was used. As shown in FIG. 34, when the characteristic (solid line) which was obtained in the case of affixing the patch member 13 on the main body 16 is compared with the case of affixing the vibration attenuating sheet having the thickness of 3 mm, 4.5 mm, or 6 mm on the main body 16, a vibration attenuating characteristic which is equivalent to the vibration attenuating characteristic of the vibration attenuating sheet having the thickness of 4.5 mm was obtained by affixing the patch member 13. However, the weight was 2.06 kg when the patch member 13 was affixed on the main body 16, whereas the weight was 2.84 kg when the vibration attenuating sheet having the thickness of 4.5 mm was affixed on the main body 16. Therefore, according to this embodiment, the weight is reduced compared with the case of affixing the vibration attenuating sheet. Moreover, the total thickness of the main body 16 and the patch member 13 was 1 mm in this embodiment and was smaller than the thickness of the main body 16 that was affixed with the vibration attenuating sheet with the thickness of 4.5 mm, and therefore, a space is easily secured when the main body 16 affixed with the patch member 13 is used in a vehicle.

In order to examine the effects of the present invention, the inventors of the present invention prepared panel members as an example and comparative examples 1 and 2. As shown in Table 1 described below, in the example and the comparative examples 1 and 2, a steel plate of 590 MPa class having a plate thickness of 0.5 mm, a length of 200 mm, and a width of 200 mm was used as the main body. As the patch member, a steel plate of 590 MPa class having a plate thickness of 0.5 mm, a length of 100 mm, and a width of 100 mm was used. The patch member was affixed at a center portion of the main body by using an acrylic resin. A linear bead portion having a height of 5 mm, a width of 20 mm, and a length of 100 mm was formed at a center portion of the panel member of each of the example and the comparative example 1. Moreover, the panel member of the example was spot-welded at a working scheduled portion (portion to be formed with the bead portion). More specifically, the spot welding was performed at portions which became a pair of bent portions (corresponding to the pair of the bent portions 28a in FIG. 16C) in the bead portion. The spot welding was performed so that five spot-welded portions would be positioned at equal intervals of 25 mm at each of the bent portions. Thus, the main body and the patch member were bonded together before the bead working.

TABLE 1

| | Main body (steel plate of 590 MPa class) | | | Patch member (steel plate of 590 MPa class) | | | | | |
|---|---|---|---|---|---|---|---|---|---|
| | Plate thickness (mm) | Length (mm) | Width (mm) | Plate thickness (mm) | Length (mm) | Width (mm) | Adhesive layer | Bead | Welding |
| Example | 0.5 | 200 | 200 | 0.5 | 100 | 100 | Acrylic resin | Formed | Performed |
| Comparative example 1 | | | | | | | | Formed | Not performed |
| Comparative example 2 | | | | | | | | Not formed | Not performed |

A frequency of a primary mode of a panel member of each of the example and the comparative examples 1 and 2 having the above structures was measured by experiment. The measurement results are shown in the following Table 2. It should be noted that the frequency of each of the example and the comparative examples 1 and 2 is shown by a dimensionless value based on the frequency of the panel member of the comparative example 2 in Table 2.

TABLE 2

| | Example | Comparative example 1 | Comparative example 2 |
|---|---|---|---|
| Frequency | 2.94 | 2.49 | 1.0 |

When the experiment result of the panel member of the comparative example 1 having the bead portion is compared with the experiment result of the comparative example 2 without the bead portion, the frequency of the primary mode of the panel member of the comparative example 1 was approximately 2.5 times greater than the frequency of the primary mode of the panel member of the comparative example 2. According to this result, by forming the bead portion, the frequency of the primary mode of the panel member is increased, whereby the vibration characteristic of the panel member in a low frequency region is improved. When the experiment result of the panel member of the example is compared with the experiment result of the panel member of the comparative example 1, the frequency of the primary mode of the panel member of the example was even greater than the frequency of the panel member of the comparative example 1 by approximately 18%. According to this result, by performing the spot welding on the working scheduled portion beforehand, the vibration characteristic of the panel member in the low frequency region is further improved. That is, the superior effects of the present invention were recognized.

As described above, according to the embodiment, by optimizing the angle α between the longitudinal direction LD and the rolling direction RD1 of the patch panel 12, the vibration characteristic of the panel member 10 is improved. Moreover, by optimizing the angle β between the longitudinal direction LD of the patch panel 12 and the rolling direction RD2 of the main panel 16 the main body 16, the vibration characteristic of the panel member 10 is improved.

As described above, according to the embodiment, since the panel member 10 is constructed by affixing the patch member 13, which is formed of the patch panel 12 and the vibration attenuating resin layer 14, on the main body 16, the vibration attenuating function is performed by the "shear deformation" of the vibration attenuating resin layer 14, whereby generation of vibration and noise due to the vibration are suppressed to a minimum. Moreover, by using the patch member 13, the plate thickness is decreased compared with a case of using a conventional vibration attenuating sheet, whereby a space within a vehicle is greatly enlarged. Furthermore, by using the patch member, the weight is further reduced compared with a case of using a conventional vibration attenuating sheet.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

INDUSTRIAL APPLICABILITY

According to the present invention, the vibration characteristic of the panel member is improved. Accordingly, the present invention can be suitably used as a panel member for various kinds of transportation vehicles.

REFERENCE SIGNS LIST

10 panel member
12, 12a, 12b patch panel
13 patch member
14 vibration attenuating resin layer
16 main panel
LD longitudinal direction of patch panel
RD1 rolling direction of patch panel
RD2 rolling direction of main panel

The invention claimed is:
1. A transportation vehicle part comprising:
a patch member constructed of
  a plate-like metal patch panel, and
  a vibration attenuating resin layer provided along a surface of the patch panel; and
a metal base plate closely adhered with the vibration attenuating resin layer of the patch member and affixed with the patch member,
wherein the patch panel is produced via a rolling step,
wherein an acute angle between a longitudinal direction and a rolling direction of the patch panel is 30 to 70 degrees,
wherein the base plate is produced via a rolling step, and
wherein an acute angle between the longitudinal direction of the patch panel and a rolling direction of the base plate is 30 to 70 degrees.
2. The transportation vehicle part according to claim 1, wherein the patch panel is a steel sheet which has a tensile strength of 590 MPa or more.
3. The transportation vehicle part according to claim 1, wherein the patch panel and the base plate are welded together at at least one part of the patch panel and the base plate.
4. The transportation vehicle part according to claim 1, wherein the transportation vehicle part includes a ridged portion, and the patch panel and the base plate are welded together at at least one part of the ridged portion.
5. The transportation vehicle part according to claim 1, wherein the transportation vehicle part is provided with a rigidity reinforced portion which has a recessed and projected shape.
6. The transportation vehicle part according to claim 1, wherein the vibration attenuating resin layer has conductivity.
7. The transportation vehicle part according to claim 1, wherein the patch panel has a thickness of 0.3 mm or more and not greater than a thickness of the base plate.
8. The transportation vehicle part according to claim 1, wherein the vibration attenuating resin layer has a thickness of 10 μman or more to 1000 μm or less.
9. The transportation vehicle part according to claim 1, wherein the vibration attenuating resin layer is constructed of multiple layers which have different temperature characteristics with each other.
10. The transportation vehicle part according to claim 9, wherein a panel is inserted between the multiple layers.
11. The transportation vehicle part according to claim 1, wherein an uneven surface processing is performed on a surface of the patch panel or a surface of the base plate, which contacts the vibration attenuating resin layer.
12. A panel member comprising:
a patch member constructed of
  a plate-like metal patch panel, and
  a vibration attenuating resin layer provided along a surface of the patch panel; and
a metal base plate closely adhered with the vibration attenuating resin layer of the patch member and affixed with the patch member,
wherein the patch panel is produced via a rolling step, and
wherein an acute angle between a longitudinal direction and a rolling direction of the patch panel is 30 to 70 degrees,
wherein the base plate is produced via a rolling step, and
wherein an acute angle between the longitudinal direction of the patch panel and a rolling direction of the base plate is 30 to 70 degrees.

* * * * *